United States Patent
Mitomi

(10) Patent No.: US 12,554,015 B2
(45) Date of Patent: Feb. 17, 2026

(54) LIGHT SOURCE MODULE, DISTANCE MEASURING DEVICE AND CONTROL METHOD

(71) Applicant: SONY SEMICONDUCTOR SOLUTIONS CORPORATION, Kanagawa (JP)

(72) Inventor: Yutaka Mitomi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1193 days.

(21) Appl. No.: 17/434,207

(22) PCT Filed: Feb. 28, 2020

(86) PCT No.: PCT/JP2020/008496
§ 371 (c)(1),
(2) Date: Aug. 26, 2021

(87) PCT Pub. No.: WO2020/184233
PCT Pub. Date: Sep. 17, 2020

(65) Prior Publication Data
US 2022/0171058 A1 Jun. 2, 2022

(30) Foreign Application Priority Data
Mar. 11, 2019 (JP) .................. 2019-044309

(51) Int. Cl.
*G01S 17/08* (2006.01)
*G01S 7/481* (2006.01)
*G01S 17/931* (2020.01)

(52) U.S. Cl.
CPC ............ *G01S 17/08* (2013.01); *G01S 7/4813* (2013.01); *G01S 7/4818* (2013.01); *G01S 17/931* (2020.01)

(58) Field of Classification Search
CPC ............................ G01S 7/4813; G01S 7/4818
See application file for complete search history.

(56) References Cited

U.S. PATENT DOCUMENTS 5,511,142 A   4/1996   Horie et al.
6,111,903 A   8/2000   Isaksson et al.
(Continued)

FOREIGN PATENT DOCUMENTS

CN   2421510 Y   2/2001
CN   1388906 A   1/2003
(Continued)

OTHER PUBLICATIONS

Machine translation of KR-20130032107-A. (Year: 2013).*
(Continued)

*Primary Examiner* — Yuqing Xiao
*Assistant Examiner* — Zhengqing Qi
(74) *Attorney, Agent, or Firm* — CHIP LAW GROUP

(57) ABSTRACT

To detect damage, peeling and the like of a diffusion plate accurately. A light source module according to an embodiment includes a light source (121), a case (125) that houses the light source and includes an emission opening through which light emitted from the light source is emitted, a cover member (125) that is disposed at the emission opening of the case and through which the light emitted from the light source is transmitted, a wave guide (126, 127) that guides a part of the light, which is emitted from the light source, in a direction that is different from the traveling direction of the light emitted from the light source, a detection unit (131) that detects the quantity of the light guided via the wave guide, and a driving unit (120) that drives the light source based on the quantity of the light detected by the detection unit.

18 Claims, 36 Drawing Sheets

(56) References Cited

U.S. PATENT DOCUMENTS

| | | | |
|---|---|---|---|
| 2004/0156590 A1* | 8/2004 | Gunn, III | G02B 6/1228 |
| | | | 385/37 |
| 2006/0145062 A1* | 7/2006 | Boehlau | G01S 7/4811 |
| | | | 250/221 |
| 2016/0164261 A1* | 6/2016 | Warren | H04N 23/56 |
| | | | 372/50.122 |
| 2017/0179680 A1* | 6/2017 | Mahgerefteh | H01S 5/12 |
| 2018/0056702 A1 | 3/2018 | Watanabe et al. | |
| 2020/0174156 A1* | 6/2020 | Terefe | G01S 17/95 |
| 2020/0271765 A1* | 8/2020 | Glover | G01S 7/4876 |
| 2021/0063318 A1* | 3/2021 | Frederiksen | G01S 7/4813 |

FOREIGN PATENT DOCUMENTS

| | | | | |
|---|---|---|---|---|
| CN | 1808196 | A | | 7/2006 |
| CN | 101000397 | A | | 7/2007 |
| CN | 103959086 | A | | 7/2014 |
| CN | 105247321 | A | | 1/2016 |
| CN | 109311121 | A | | 2/2019 |
| DE | 19828069 | A | | 1/1999 |
| DE | 102006045916 | A1 | * 4/2008 | ........... G01N 21/958 |
| EP | 0420173 | A2 | | 4/1991 |
| FR | 2765412 | A1 | | 1/1999 |
| GB | 2326760 | A | | 12/1998 |
| JP | 60-080807 | A | | 5/1985 |
| JP | 03-110505 | A | | 5/1991 |
| JP | 06-050371 | U | | 7/1994 |
| JP | 11-087845 | A | | 3/1999 |
| JP | 2000-074861 | A | | 3/2000 |
| JP | 2008-172002 | A | | 7/2008 |
| JP | 2014-085280 | A | | 5/2014 |
| JP | 2014-190823 | A | | 10/2014 |
| JP | 2018-028598 | A | | 2/2018 |
| KR | 10-2013-0032107 | A | | 4/2013 |
| KR | 20130032107 | A | * 4/2013 | ................ F21V 5/00 |

OTHER PUBLICATIONS

WO2005062026A1 (Year: 2005).*
Machine translation of WO2005062026A1. (Year: 2005).*
Machine translation of DE-102006045916-A1. (Year: 2008).*
International Search Report and Written Opinion of PCT Application No. PCT/JP2020/008496, issued on May 26, 2020, 12 pages of ISRWO.

* cited by examiner

LIGHT SOURCE MODULE, DISTANCE MEASURING DEVICE AND CONTROL METHOD

CROSS REFERENCE TO RELATED APPLICATIONS

This application is a U.S. National Phase of International Patent Application No. PCT/JP2020/008496 filed on Feb. 28, 2020, which claims priority benefit of Japanese Patent Application No. JP 2019-044309 filed in the Japan Patent Office on Mar. 11, 2019. Each of the above-referenced applications is hereby incorporated herein by reference in its entirety.

TECHNICAL FIELD

The present disclosure relates to a light source module, a distance measuring device, and a control method.

BACKGROUND ART

In recent years, a distance image sensor that measures a distance based on a Time-of-Flight (ToF) method is receiving attention (this sensor hereafter referred to as "ToF sensor"). A common ToF sensor includes a light-emitting unit and a light-receiving unit, and the distance to an object is measured based on the time difference between the emission of light at the light-emitting unit to the reception of the light at the light-receiving unit.

CITATION LIST

Patent Literature

[PTL1]
JP 2014-085280 A
[PTL2]
JP 2014-190823 A

SUMMARY

Technical Problem

For a light source for a ToF sensor, a laser light source, of which output is relatively high, is normally used. The laser light output from the laser light source is diffused by a diffusion plate first, and then output toward a distance measuring target region in the front direction.

In a case where the diffusion plate is damaged or is peeled off for any reason, a sufficient quantity of laser light may not be emitted to the distance measuring target region. In order to minimize the occurrence of such problems, damage, peeling and the like of the diffusion plate must be detected accurately.

With the foregoing in view, it is an object of the present disclosure to provide a light source module, a distance measuring device and a control method that allow to accurately detect damage, peeling and the like of the diffusion plate.

Solution to Problem

To solve the problem, a light source module according to an aspect of the present disclosure includes: a light source; a case that houses the light source and includes an emission opening through which light emitted from the light source is emitted; a cover member that is disposed at the emission opening of the case and through which the light emitted from the light source is transmitted; a wave guide that guides a part of the light, which is emitted from the light source, in a direction that is different from the traveling direction of the light emitted from the light source; a detection unit that detects the quantity of the light guided via the wave guide; and a driving unit that drives a light source based on the quantity of the light detected by the detection unit.

BRIEF DESCRIPTION OF DRAWINGS

FIG. 2 is a cross-sectional view depicting a general configuration example of a common light-emitting unit that is used for a distance measuring device or the like.

DESCRIPTION OF EMBODIMENTS

Figure 1:
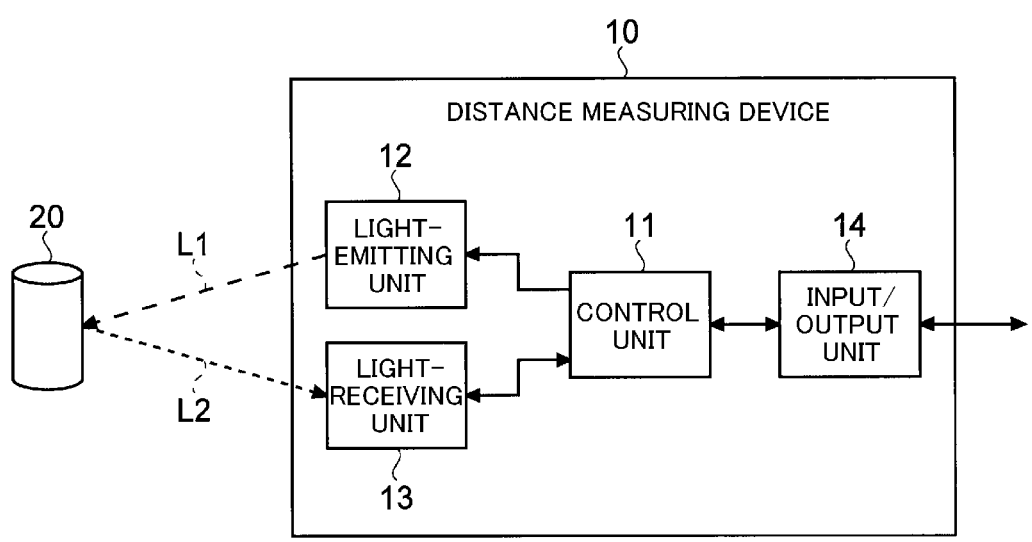
FIG. 1 is a block diagram depicting a general configuration example of a distance measuring device according to Embodiment 1.

Embodiments of the present disclosure will be described in detail with reference to the drawings. In the following embodiments, the same regions are denoted with a same reference sign, and redundant description thereof is omitted.

The present disclosure will be described in accordance with the following item sequence.

1. Embodiment 1
1.1 Configuration example of distance measuring device
1.2 Configuration example of common light-emitting unit
1.3 Configuration example of light-emitting unit and light-receiving unit
1.4 Control method
1.5 Example of optical guide unit
1.5.1 Installation surface of optical guide unit
1.5.2 Cross-sectional shape of optical guide unit
1.5.3 Planar shape of optical guide unit
1.5.4 Position of optical guide unit with respect to light source
1.6 Examples of cases
1.6.1 Example 1
1.6.2 Example 2
1.6.2.1 Modification of Example 2
1.6.3 Example 3
1.6.4 Example 4
1.6.5 Example 5
1.7 Functions and effects
1.8 Modifications
1.8.1 Modification 1
1.8.2 Modification 2
2. Embodiment 2
2.1 Configuration example of light-emitting unit and light-receiving unit
2.2 Control method
2.3 Functions and effects
3. Application Examples 1. Embodiment 1

Embodiment 1 will be described in detail first with reference to the drawings 1.1 Configuration Example of Distance Measuring Device FIG. 1 is a block diagram depicting a general configuration example of a distance measuring device according to Embodiment 1. The distance measuring device 10 according to Embodiment 1 is configured as a distance image sensor using a ToF system, for example.

As illustrated in FIG. 1, the distance measuring device 10 includes a control unit 11, a light-emitting unit 12, a light-receiving unit 13 and an input/output unit 14.

The control unit 11 is constituted of an information processor that includes a microcomputer and a logic circuit, for example. The control unit 11 operates as a central processor in the distance measuring device 10, which controls operation of each composing element and performs various types of arithmetic processing.

The light-emitting unit 12 is a light source device, such as a vertical cavity surface-emitting laser (VCSEL) or a light-emitting diode (LED), for example, and emits an irradiation light L1 having a rectangular pulse form toward a distance measurement target range according to the control by the control unit 11.

When the irradiation light L1 emitted from the light-emitting unit 12 is applied to an object 20 that exists in a distance measurement range, the irradiation light L1 is reflected in accordance with the reflectance of the object 20. The reflected light L2, which was reflected by the object 20, is directed toward the distance measuring device 10 and enters into the light-receiving unit 13 via a lens (not illustrated).

The light-receiving unit 13 is constituted of a solid-state image pickup element using a complementary metal oxide semiconductor (CMOS), for example. This solid-state image pickup element has a configuration of a plurality of pixels arrayed in a matrix, each of which has a photoelectric conversion element.

The control unit 11 synchronously controls the light emitting of the light-emitting unit 12 and the light receiving of the light-receiving unit 13. The light-receiving unit 13 performs the shutter operation in accordance with the control by the control unit 11, captures an image of the reflected light L2 from the object 20, and outputs the image capturing result (exposure amount) to the control unit 11.

The control unit 11 generates information on the distance to the object 20 based on the image capturing result (exposure amount) from the light-receiving unit 13, and outputs the generated distance information to the input/output unit 14.

The input/output unit 14 is constituted of an input/output interface circuit based on a predetermined standard, such as the universal serial bus (USB), and inputs or outputs the data exchanged between the control unit 11 and an external device.

The distance measuring device 10 having the above configuration is a direct system type or an indirect system type, for example. The direct system is a type where the time, from the light-emitting unit 12 emitting the irradiation light L1 to the light-receiving unit 13 detecting the reflected light L2 (traveling time) is measured and the distance to the object 20 is calculated based on this traveling time, for example. The indirect system is a type where a modulated light is used as the irradiation light L1 emitted from the light-emitting unit 12, and the distance to the object 20 is calculated based on the difference of the exposure amount (phase difference) of the reflected lights L2 acquired by two shutter operations, which are executed with shifting the timing.

1.2 Configuration Example of Common Light-Emitting Unit

Figure 2:
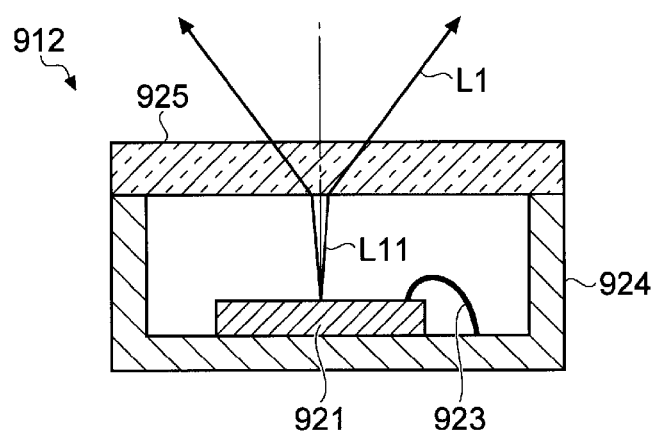

FIG. 2 is a cross-sectional view depicting a general configuration example of a common light-emitting unit that is used for a distance measuring device or the like. As illustrated in FIG. 2, a common light-emitting unit 812 has a configuration where such a light source 921 as a VCSEL and an LED is housed in a case 924. At an emission opening of the light in the case 924, a diffusion plate 925, that diffuses the laser light L11 emitted from the light source 921, is disposed. The light source 921 inside the case 924 is connected to a laser driver, a light source and the like (not illustrated) via a wiring 923 and wires disposed on the case 924.

In this way, in the common light-emitting unit used for the distance measuring device or the like, the diffusion plate 925 is disposed on the light emitting surface of the irradiation light L1 in order to adjust a beam profile of the irradiation light L1 to be emitted. The diffusion plate 925 diffuses the laser light L11, which is emitted from the light source 921, such as a VCSEL and an LED, at a small light emission angle, whereby the laser light L11 at a small light emission angle can be converted into the irradiation light L1 which is diffused in a wide range. Further, disposing the diffusion plate 925 on the light source 921 also prevents strong light from the light source 921 directly entering human eyes.

As described above, the diffusion plate 925 is one of the critical composing elements of an electronic apparatus equipped with a light source 921, such as the distance measuring device 10. Therefore, in such an electronic apparatus, damage, peeling or the like of the diffusion plate 925 must be detected accurately.

Figure 3:
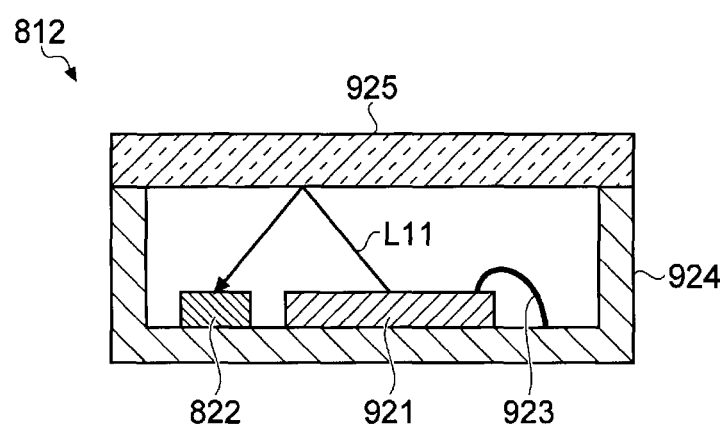
FIG. 3 is a cross-sectional view depicting a general configuration example of a distance measuring device according to a reference example of Embodiment 1.

A possible method of detecting damage, peeling or the like of the diffusion plate 925 is a method of detecting the quantity of the laser light L11 reflected by the diffusion plate 925 by disposing an optical sensor 822, such as a photodiode, inside the case 924, as illustrated in a light-emitting unit 812 in FIG. 3.

However, with this method, the optical sensor 822 may not be able to detect damage or peeling generated in the diffusion plate 925 depending on the location thereof.

Therefore, in Embodiment 1, a light source module, a distance measuring device and a control method that can accurately detect an abnormality (e.g. damage, peeling) generated in the diffusion plate is proposed.

1.3 Configuration Example of Light-Emitting Unit and Light-Receiving Unit

Figure 4:
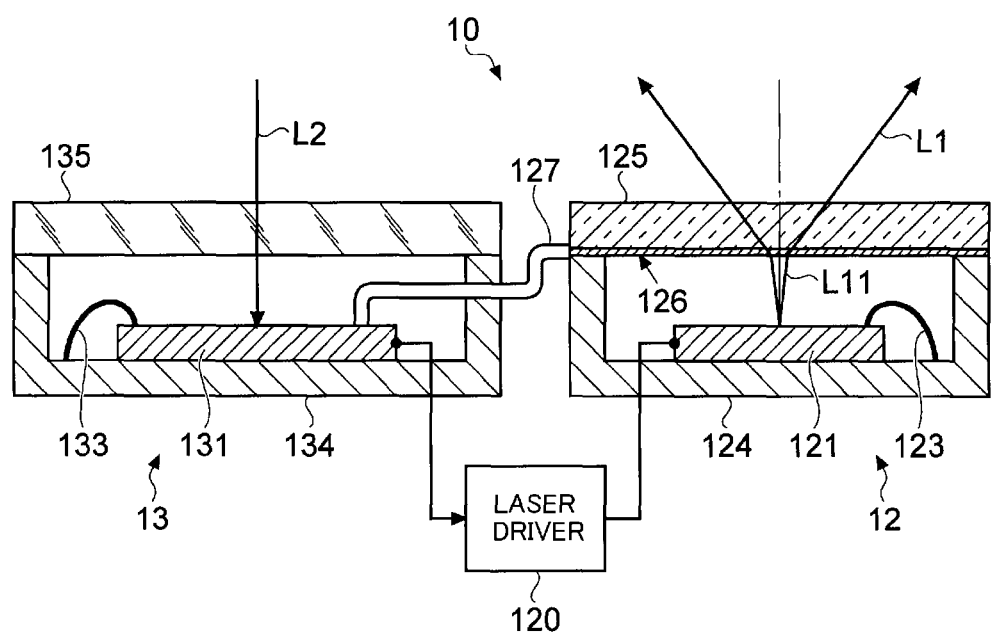
FIG. 4 is a cross-sectional view depicting a general configuration example of a light-emitting unit and a light-receiving unit according to Embodiment 1.

FIG. 4 is a cross-sectional view depicting a general configuration example of the light-emitting unit and the light-receiving unit according to Embodiment 1. FIG. 4 indicates an example of a cross-sectional structure sectioned at a plane that is parallel with the optical axis of the laser light L11 emitted from a light source 121 (this plane is referred to as "vertical plane"). In the configuration in FIG. 4, a laser driver 120 may be included in the light-emitting unit 12, or may be the control unit 11 in FIG. 1 itself, or may be included in the control unit 11.

As illustrated in FIG. 4, the light-emitting unit 12 includes the light source 121, a case 124 and a diffusion plate 125.

The light source 121 may be a light source that emits the laser light L11, such as a VCSEL and an LED. The case 124 includes a cavity that houses the light source 121 and an emission opening through which the laser light L11, emitted from the light source 121, passes. For this case 124, various materials, such as plastic and metal, can be used.

At the emission opening of the case 124, the diffusion plate 125, which diffuses and transmits the laser light L11 emitted from the light source 121, is disposed as a cover member. The light source 121 inside the case 124 is connected to the laser driver 120 disposed outside the case 124, for example. The light source 121 is also connected to a power supply and the like (not illustrated) via wiring 123 and the wires disposed on the case 124.

The light-receiving unit 13, on the other hand, includes an image sensor 131, a case 134 and a glass substrate 135.

The image sensor 131 includes a configuration where a plurality of pixels, each of which includes a photoelectric conversion element, are arrayed in a matrix, for example, and generates a pixel signal from the light that entered each pixel, in accordance with the light quantity thereof, whereby image data is generated and output. The image sensor 131 is also connected to a power supply and the like (not illustrated) via wiring 133 and the wires disposed on the case 134.

The case 134 includes a cavity that houses the image sensor 131 and an entry opening through which the light that enters the image sensor 131 (including the reflected light L2) passes. For this case 134, various materials, such as plastic and metal, can be used, just like the case 124. At the entry opening of the case 134, the transparent glass substrate 135 is disposed as a cover member, whereby the light-receiving surface of the image sensor 131 is protected from damage and contamination.

In this configuration, an optical guide unit 126 is disposed at the diffusion plate 125 of the light-emitting unit 12, as a part of a wave guide to direct a part of the laser light L11 emitted from the light source 121 to a direction that is different from the traveling direction of the light from the light source 121 (e.g. light emission axis). The optical guide unit 126 receives a part of the laser light L11 emitted from the light source 121, and guides the received laser light L11 to at least one of the end faces of the diffusion plate 125. The end faces of the diffusion plate 125 may be four surfaces (side faces) that intersect orthogonally with the entry surface of the laser light L11.

One end of an optical fiber 127 is attached to the end face of the diffusion plate 125 and at the edge of the optical guide unit 126. The other end of the optical fiber 127 contacts with or is in proximity to a part of the light-receiving region (hereafter referred to as "detection region") on the light-receiving surface of the image sensor 131, for example.

The optical fiber 127 is a part of the wave guide that guides a part of the laser light L11 emitted from the light source 121 in a direction that is different from the emission axis of the light source 121. The laser light L11 received by the optical guide unit 126 enters the detection region of the image sensor 131 via the optical guide unit 126 and the optical fiber 127.

The image sensor 131, on the other hand, measures the quantity of the laser light L11 which entered the detection region via the optical fiber 127, and inputs the measurement result to the laser driver 120. In other words, in Embodiment 1, a part of the region (detection region) in the image sensor 131 is used as a detection unit that detects the quantity of the laser light L11 emitted from the light source 121.

The quantity of the laser light L11 that entered the detection region may be input to the laser driver 120 as a pixel value of each pixel, or may be input to the laser driver 120 as a total of the pixel value of each pixel. In the following description, the quantity of the laser light L11 that entered the detection region is referred to as "light quantity information".

Based on the light quantity information input from the image sensor 131, the laser driver 120 determines whether there is such an abnormality as damage and peeling in the diffusion plate 125, and drives the light source 121 based on this determination result. For example, in the case where the input light quantity information is lower than the light quantity information during a normal time, the laser driver 120 determines that there is such an abnormality as damage and peeling in the diffusion plate 125, and stops or disables the light emission of the light source 121. In the case where the input light quantity information is the same or more than the light quantity information during a normal time, the laser driver 120 determines that the diffusion plate 125 is normal, and continues or enables the light emissions of the light source 121.

1.4 Control Method

Figure 5:
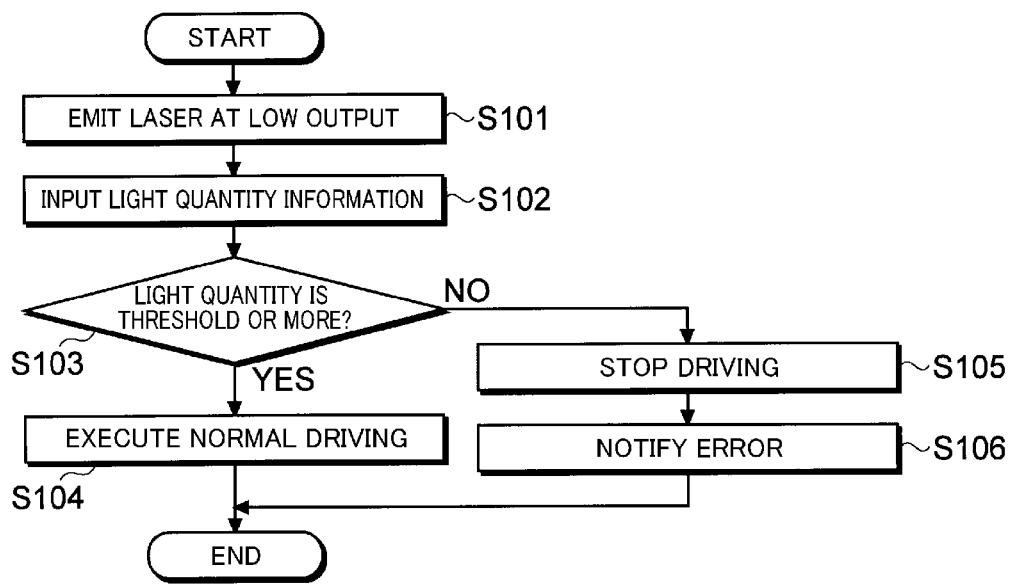
FIG. 5 is a flow chart depicting an example of a control method executed by a laser driver according to Embodiment 1.

FIG. 5 is a flow chart depicting an example of the control method executed by the laser driver according to Embodiment 1. The operation indicated in FIG. 5 may be executed, for example, as a part of the initial operation when the distance measuring device is started up.

As indicated in FIG. 5, in this operation, the laser driver 120 causes the light source 121 to emit light at low output after startup (step S101). The low output may cause the light source 121 to emit light at a drive current that is lower than the drive current used during normal operation, such as 80% or 50% or less drive current.

Then the laser driver 120 inputs the light quantity information acquired in the detection region of the image sensor 131 (step S102), and determines whether the input light quantity information is a predetermined light quantity threshold or more (step S103). The light quantity threshold according to Embodiment 1 may be a light quantity value of the light quantity information acquired in the detection region, or the lower limit value thereof in the case where the diffusion plate 125 is normal and the light source 121 causes to emit light at low output.

In the case where the light quantity value indicated in the light quantity information is the light quantity threshold or more (YES in step S103), the laser driver 120 executes the normal driving of the light source 121 (step S104), then ends this operation.

In the case where the light quantity value indicated in the light quantity information is less than the light quantity threshold (NO in step S103), on the other hand, the laser driver 120 stops driving of the light source 121 (step S105). Then the laser driver 120 notifies the abnormality of the diffusion plate 125 to the user via a speaker, LED (not illustrated) or the like (step S106), then ends this operation.

Figure 6:
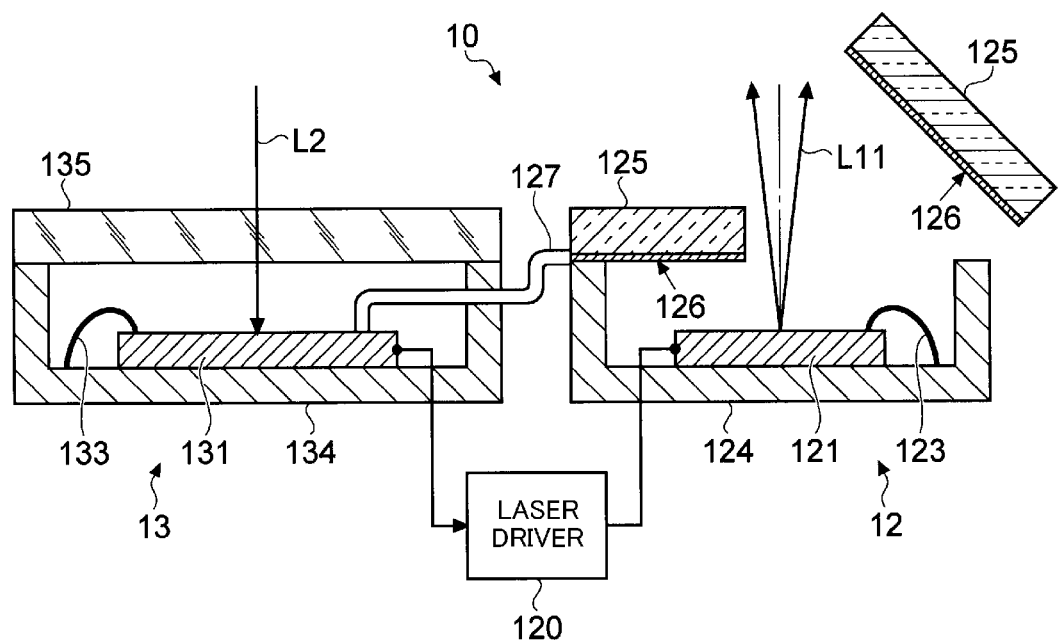
FIG. 6 is a diagram for describing an operation when an abnormality occurs to a diffusion plate of the distance measuring device according to Embodiment 1 (Part 1).

In the case where the diffusion plate 125 is damaged, a part thereof falls off, and the laser light L11 is emitted directly to the outside, as illustrated in FIG. 6, for example, the light quantity of the laser light L11 that enters the detection region of the image sensor 131 from the optical guide unit 126 via the optical fiber 127 decreases considerably. However, if the above mentioned operation, such an abnormality of the diffusion plate 125 can be detected, and driving of the light source 121 can be stopped.

Figure 7:
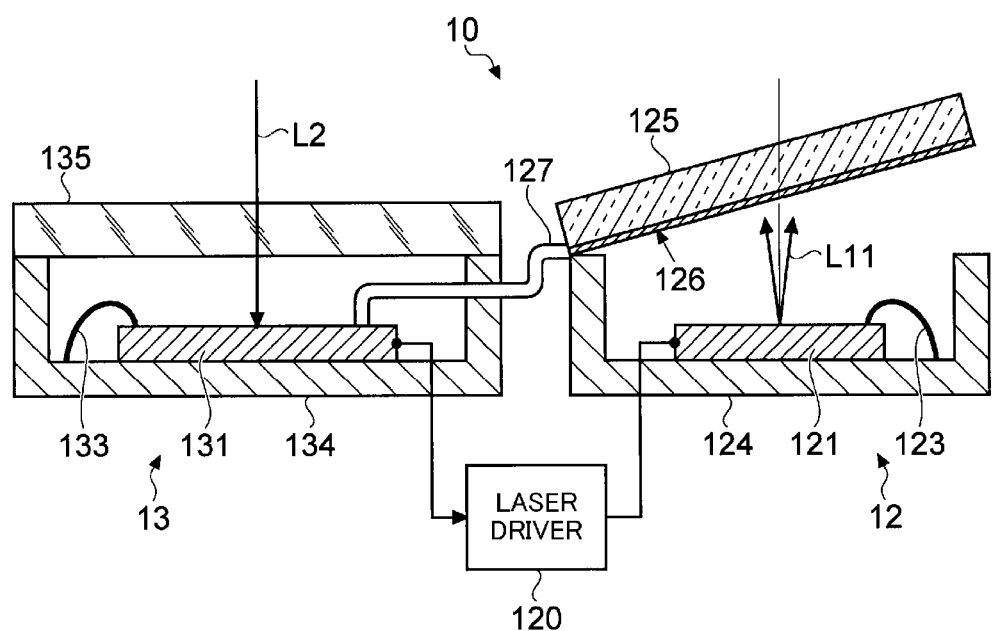
FIG. 7 is a diagram for describing an operation when an abnormality occurs to the diffusion plate of the distance measuring device according to Embodiment 1 (Part 2).

Further, in the case where a part of the diffusion plate 125 peels off as well, as illustrated in FIG. 7, for example, the light quantity of the laser light L11 that enters the detection region of the image sensor 131 from the optical guide unit 126 via the optical fiber 127 decreases because the laser light L11 that enters the optical guide unit 126 decreases. In this case as well, such an abnormality of the diffusion plate 125 can be detected, and driving of the light source 121 can be stopped.

1.5 Example of Optical Guide Unit

The optical guide unit 126 that guides the entered laser light L11 will be described next with reference to a few specific examples.

1.5.1 Installation Surface of Optical Guide Unit

Figure 8:
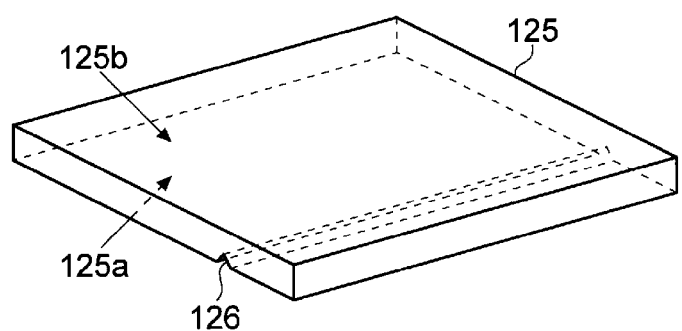
FIG. 8 is a perspective view for describing an example of a surface of the diffusion plate where an optical guide unit according to Embodiment 1 is disposed.
Figure 9:
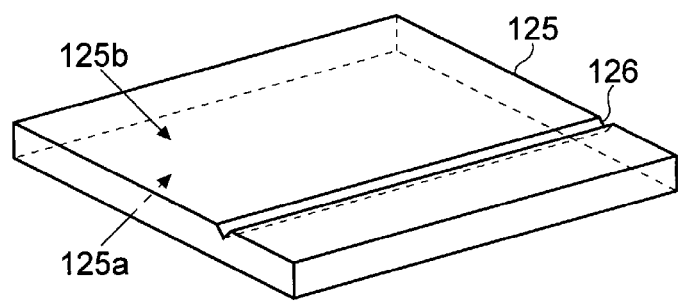
FIG. 9 is a perspective view for describing another example of a surface of the diffusion plate where the optical guide unit according to Embodiment 1 is disposed.
Figure 10:
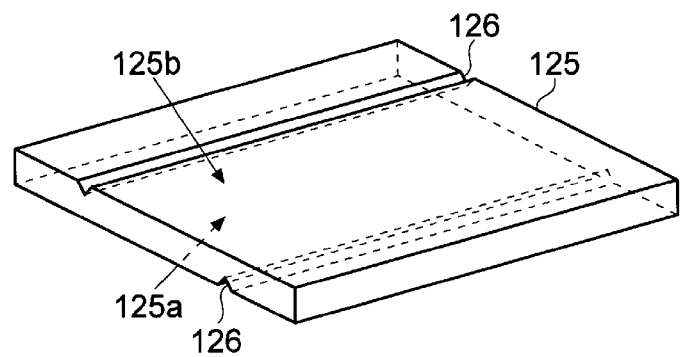
FIG. 10 is a perspective view for describing still another example of a surface of the diffusion plate where the optical guide unit according to Embodiment 1 is disposed.

FIG. 8 to FIG. 10 are perspective views for describing a surface of the diffusion plate where the optical guide unit according to Embodiment 1 is disposed. In the following description, a surface of the diffusion plate 125 facing the light source 121 is assumed to be a rear surface 125a, and a surface on the opposite side of the rear surface 125a is assumed to be a front surface 125b.

The optical guide unit 126 according to Embodiment 1 may be disposed, for example, on the rear surface 125a of the diffusion plate 125, as illustrated in FIG. 8, or on the front surface 125b of the diffusion plate 125, as illustrated in FIG. 9. Further, the optical guide unit 126 may be disposed on the rear surface 125a and the front surface 125b of the diffusion plate 125 respectively, as illustrated in FIG. 10. In this case, the optical guide unit 126 that is disposed on a rear surface 125a and the optical guide unit 126 that is disposed on the front surface 125b may overlap with each other or may shift from each other in the thickness direction of the diffusion plate 125.

1.5.2 Cross-Sectional Shape of Optical Guide Unit

Figure 11:
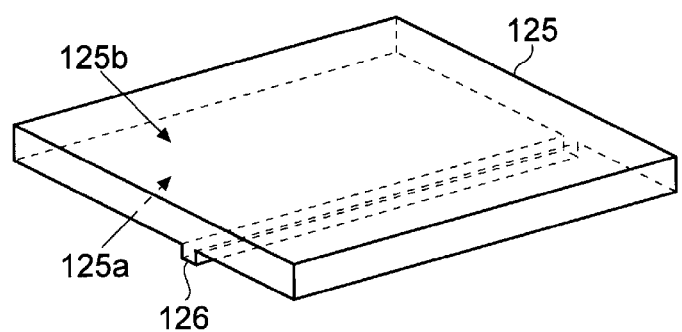
FIG. 11 is a perspective view depicting another example of the cross-sectional shape of the optical guide unit according to Embodiment 1.

FIG. 11 is a perspective view depicting another example of the cross-sectional shape of the optical guide unit according to Embodiment 1.

The optical guide unit 126 according to Embodiment 1 may, for example, be a slit type groove that is formed in the diffusion plate 125, as illustrated in FIG. 8 to FIG. 10, or may be a mesa type structure which protrudes in a convex shape from the diffusion plate 125, as illustrated in FIG. 11.

1.5.3 Planar Shape of Optical Guide Unit

FIG. 12 to FIG. 17 are diagrams depicting examples of a planar shape along the disposing surface of the optical guide unit according to Embodiment 1.

Figure 12:
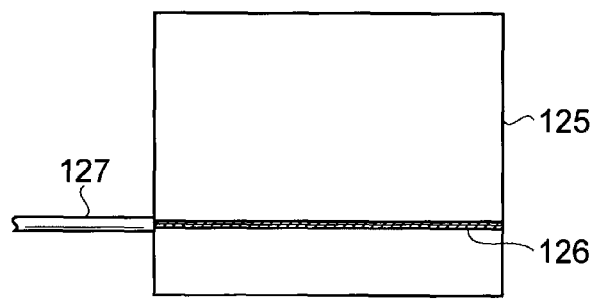
FIG. 12 is a diagram depicting an example of the planar shape of the optical guide unit along the disposing surface according to Embodiment 1.
Figure 13:
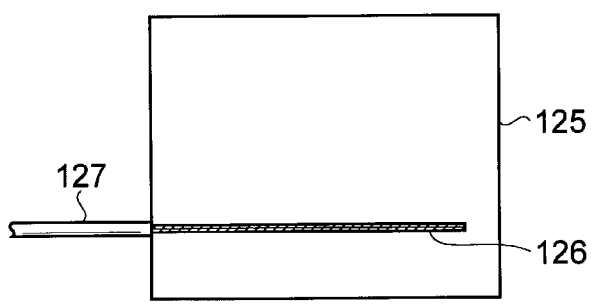
FIG. 13 is a diagram depicting another example of the planar shape of the optical guide unit along the disposing surface according to Embodiment 1.

For example, the optical guide unit 126 according to Embodiment 1 may have a planar cross-sectional shape which linearly extends from a first end face of the diffusion plate 125 to a second end face that faces the first end face, as illustrated in FIG. 12, or may have a planar shape which linearly extends from a first end face of the diffusion plate 125 to a portion immediately before a second end face that faces the first end face, as illustrated in FIG. 13.

Figure 14:
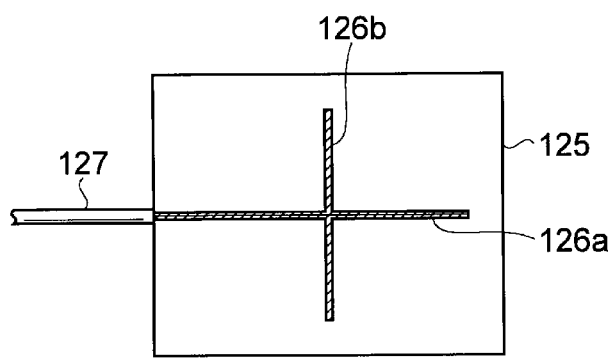
FIG. 14 is a diagram depicting still another example of the planar shape of the optical guide unit along the disposing surface according to Embodiment 1.

Further, for example, the optical guide unit 126 may have a planar shape where two linear-shaped optical guides 126a and 126b cross with each other, as illustrated in FIG. 14. In this case, at least one end face of the optical guide 126a and at least one end face of the optical guide 126b should reach the end face of the diffusion plate 125.

Figure 15:
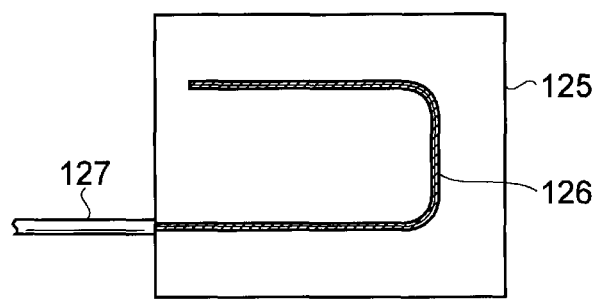
FIG. 15 is a diagram depicting still another example of the planar shape of the optical guide unit along the disposing surface according to Embodiment 1.
Figure 16:
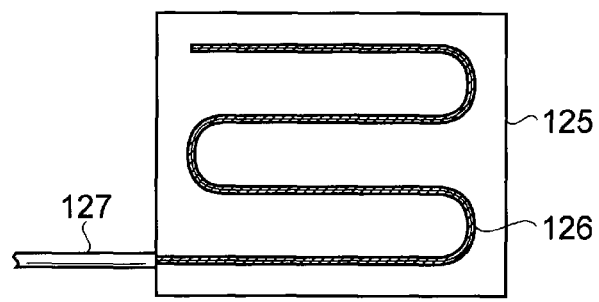
FIG. 16 is a diagram depicting still another example of the planar shape of the optical guide unit along the disposing surface according to Embodiment 1.
Figure 17:
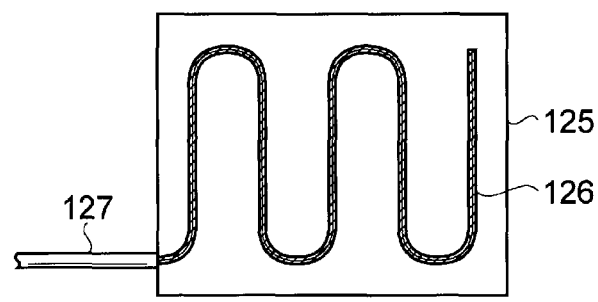
FIG. 17 is a diagram depicting still another example of the planar shape of the optical guide unit along the disposing surface according to Embodiment 1.

Furthermore, for example, the optical guide unit 126 may have a U-curved planar shape, as illustrated in FIG. 15, or may have a bellows-shaped planar shape, as illustrated in FIG. 16 or FIG. 17.

As described above, the shape of the optical guide unit 126 is not limited to a linear planar shape, but may be curve-shaped. The optical guide unit 126 is not limited to one optical guide, but may be constituted of a plurality of optical guides. In this case, it is preferable that each optical guide crosses with another optical guide at least at one location, in order to prevent the plurality of optical guides from being separated into two or more lines of the optical guide units 126.

1.5.4 Position of Optical Guide Unit with Respect to Light Source

Figure 18:
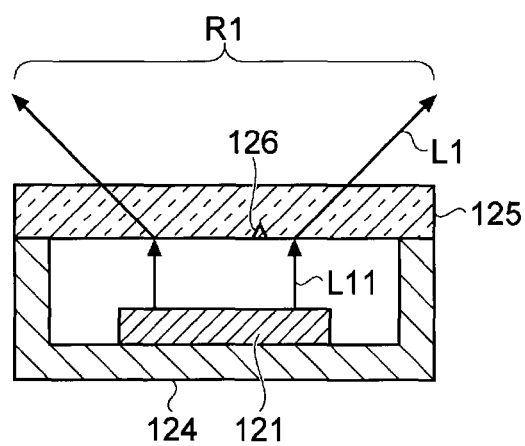
FIG. 18 is a cross-sectional view for describing an example of a position of the optical guide unit with respect to the light source according to Embodiment 1.
Figure 19:
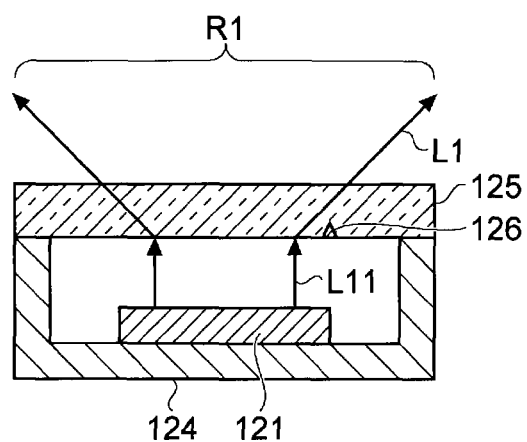
FIG. 19 is a cross-sectional view for describing another example of a position of the optical guide unit with respect to the light source according to Embodiment 1.

FIG. 18 and FIG. 19 are cross-sectional views for describing a position of the optical guide unit with respect to the light source according to Embodiment 1. FIG. 18 and FIG. 19 indicate examples where the optical guide unit 126 is disposed on the rear surface 125a of the diffusion plate 125, but the present technology is not limited to these, and the optical guide unit 126 may be disposed on the front surface 125b, or on both the rear surface 125a and the front surface 125b of the diffusion plate 125.

At least a part of the optical guide unit 126 may be disposed in an effective region R1 of the laser light L11 that is emitted from the light source 121, as illustrated in FIG. 18, for example. The effective region R1 may be a region having a beam width the full width at half maximum (FWHM), at which a beam intensity is at least half of the peak beam intensity, in an intensity profile along the wave front of the laser light L11, for example.

By disposing the optical guide unit 126 in the effective region R1 like this, a part of the high intensity laser light L11 emitted from the light source 121 can be guided to the image sensor 131 via the optical fiber 127, hence an abnormality generated in the diffusion plate 125 can be detected more accurately.

Even in the case where the optical guide unit 126 is disposed in the effective region R1, the laser light L11 which entered the diffusion plate 125 is diffused and then output as the irradiation light L1, hence the shadow of the optical guide unit 126, which appears in the irradiation light L1, can be sufficiently reduced.

The disposition of the laser light L11 is not limited to inside the effective region R1, but may be outside the effective region R1 of the laser light L11, as illustrated in FIG. 19. In this case, as well, the laser light L11 which has a certain level of intensity enters the optical guide unit 126, hence the abnormality of the diffusion plate 125 can be detected. Furthermore, because the optical guide unit 126 does not exist in the effective region R1, influence of the optical guide unit 126 on the irradiation light L1 can be substantially prevented.

1.6 Examples of Cases

Examples of the case 124, in which the diffusion plate 125 is fixed, will be described next with reference to a few concrete examples.

1.6.1 Example 1

Figure 20:
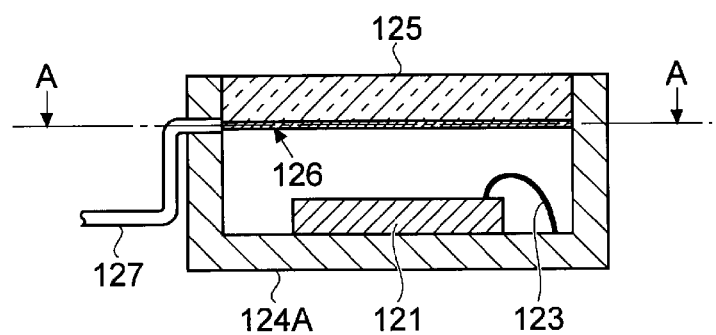
FIG. 20 is a vertical cross-sectional view depicting a configuration example of the case according to Example 1 of Embodiment 1.
Figure 21:
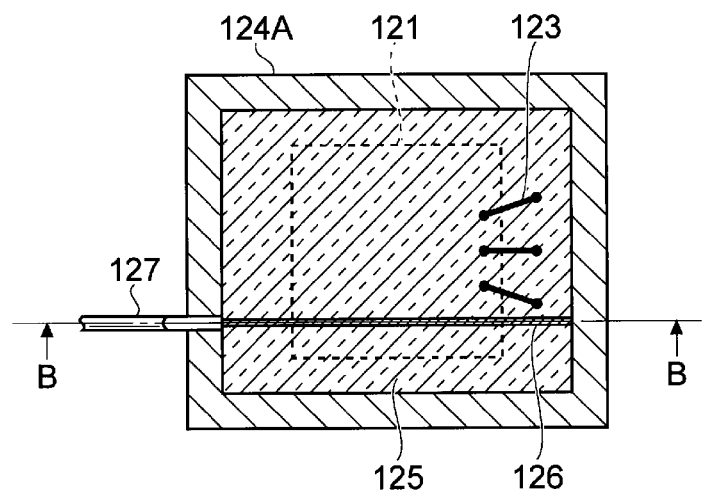
FIG. 21 is a horizontal cross-sectional view depicting a configuration example of the case according to Example 1 of Embodiment 1.

FIG. 20 and FIG. 21 are cross-sectional views depicting configuration examples of the case according to Example 1. FIG. 21 indicates an example of the cross-sectional structure of the A-A plane in FIG. 20, and FIG. 20 indicates an example of the cross-sectional structure at the B-B plane in FIG. 21.

As illustrated in FIG. 20 and FIG. 21, a case 124A according to Example 1 has a structure of housing the diffusion plate 125 inside the emission opening, so as to hold the diffusion plate 125 by four side faces. On the side wall of the case 124A where one edge of the optical guide unit 126 of the diffusion plate 125 is located in the housed state, a through hole, to insert the optical fiber 127, is formed.

In the case where the case 124A has a structure to hold the diffusion plate 125 by four side surface thereof, an optical guide unit 126 reaching the end face of the diffusion plate 125 at a plurality of locations, as described above with reference to FIG. 12, for example, may be used for the optical guide unit 126. The through hole to insert the optical fiber 127 may be disposed at a location corresponding to one end out of the plurality of ends of the optical guide unit 126 reaching the end face of the diffusion plate 125.

By using a configuration where four end faces of the diffusion plate 125 contact the inner side faces of the case 124A, the diffusion plate 125 can be easily positioned with respect to the case 124A and the light source 121 fixed to the base of the cavity of the case 124A.

1.6.2 Example 2

Figure 22:
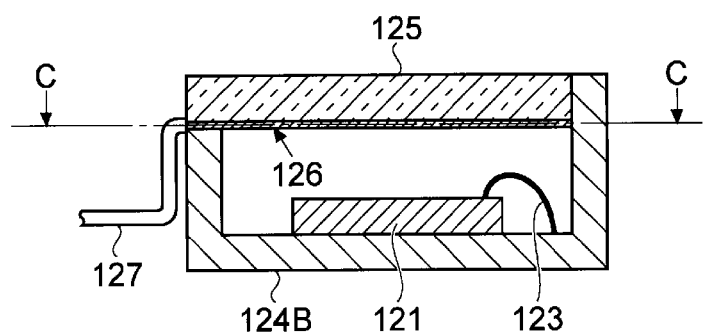
FIG. 22 is a vertical cross-sectional view depicting a configuration example of the case according to Example 2 of Embodiment 1.
Figure 23:
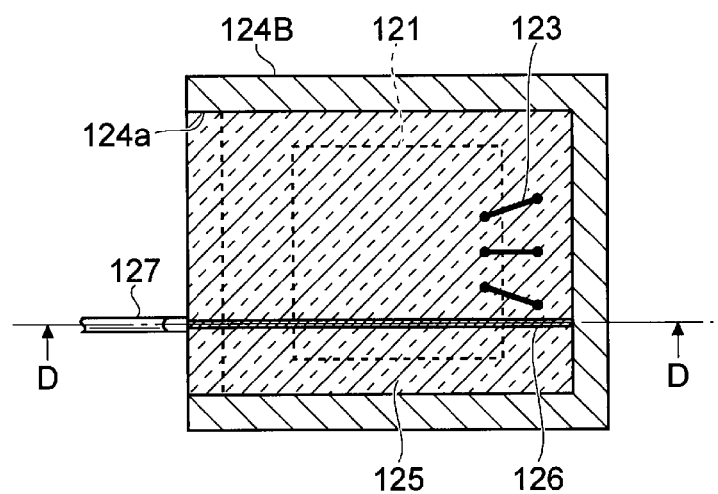
FIG. 23 is a horizontal cross-sectional view depicting a configuration example of the case according to Example 2 of Embodiment 1.

FIG. 22 and FIG. 23 are cross-sectional views depicting configuration examples of the case according to Example 2. FIG. 23 indicates an example of the cross-sectional structure at the C-C plane in FIG. 22, and FIG. 22 indicates an example of the cross-sectional structure at the D-D plane in FIG. 23.

As illustrated in FIG. 22 and FIG. 23, a case 124B according to Example 2 has a structure of holding the diffusion plate 125 by three side faces, and the edge, which is not held by the side face of the diffusion plate 125, is supported by the rear surface 125a of the diffusion plate 125. In other words, the case 124B includes one opening 124a that leaves one of the four sides of the diffusion plate 125 open.

Out of the four side faces of the diffusion plate 125, a side face where a first end of the optical guide unit 126 reaches is disposed at the opening 124a. In this case, the end of the optical fiber 127 can be connected to the end of the optical guide unit 126 without forming the through hole in the case 124B.

In the case where a second end of the optical guide unit 126 reaches an end face of the diffusion plate 125 that is different from the end face where the first end reaches, an optical guide unit 126, which reaches the end face of the diffusion plate 125 at a plurality of locations, as described above with reference to FIG. 12, can be used just like Example 1. However, in the case of an optical guide unit 126 of which one end reaches the end face of the diffusion plate 125 (e.g. see FIG. 13 to FIG. 17 in the above description), these conditions need not be considered.

Further, by using the configuration where three end faces of the diffusion plate 125 contact the inner side faces of the case 124B, the diffusion plate 125 can be easily positioned with respect to the case 124B and the light source 121 which is fixed to the base of the cavity of the case 124B.

1.6.2.1 Modification of Example 2

Figure 24:
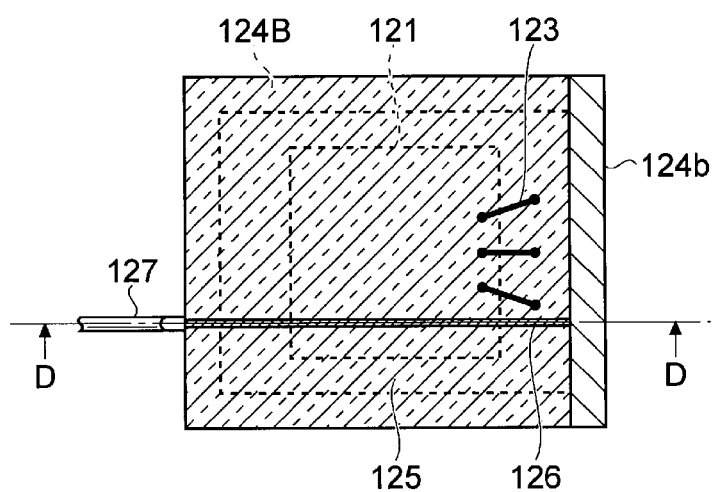
FIG. 24 is a vertical cross-sectional view depicting a configuration example of the case according to a modification of Example 2 of Embodiment 1.

In Example 2, the case where three out of four side faces of the diffusion plate 125 contact the inner side faces of the case 124B was described, but the present technology is not limited to this configuration, but may have a configuration where at least one side wall 124b of the case 124B protrudes so that at least one of the four side faces of the diffusion plate 125 contact the inner side faces of the case 124B, as illustrated in FIG. 24.

With this configuration as well, the diffusion plate 125 can be easily positioned with respect to the case 124B and the light source 121 which is fixed to the base of the cavity of the case 124B.

In the case where the second end of the optical guide unit 126 reaches the end face of the diffusion plate 125 where the first end reaches, it is preferable that this end face of the diffusion plate 125 where the second end reaches contacts the inner side face of the case 124B. Thereby, just like Example 1, the optical guide unit 126 which reaches the end face of the diffusion plate 125 at a plurality of locations, as described above with reference to FIG. 12, can be used. However, in the case of an optical guide unit 126 of which one end reaches the end face of the diffusion plate 125 (e.g. see FIG. 13 to FIG. 17 in the above description), these conditions need not be considered.

1.6.3 Example 3

Figure 25:
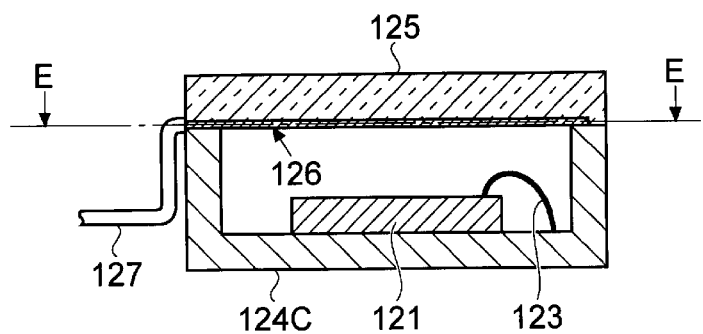
FIG. 25 is a vertical cross-sectional view depicting a configuration example of the case according Example 3 of Embodiment 1.
Figure 26:
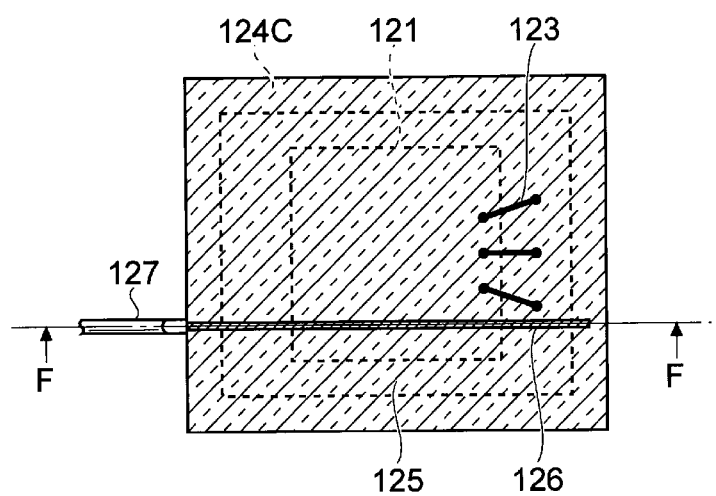
FIG. 26 is a horizontal cross-sectional view depicting a configuration example of the case according Example 3 of Embodiment 1.

FIG. 25 and FIG. 26 are cross-sectional views depicting configuration examples of the case according to Example 3. FIG. 26 indicates an example of the cross-sectional structure at the E-E plane in FIG. 25, and FIG. 25 indicates an example of the cross-sectional structure at the F-F plane in FIG. 26.

As illustrated in FIG. 25 and FIG. 26, a case 124C according to Example 3 has a structure of supporting the four ends of the diffusion plate 125 from the rear surface 125a, for example.

In this configuration, all four end faces of the diffusion plate 125 are open, hence it is preferable that the optical guide unit 126 of which first end reaches an end face of the diffusion plate 125, as described above with reference to FIG. 13 to FIG. 17, for example, is used for the optical guide unit 126. Thereby the leakage of the laser light L11 from the second end of the optical guide unit 126 can be reduced, and therefore the quantity of the laser light L11 that enters the detection region of the image sensor 131 via the optical fiber 127 is not reduced very much.

1.6.4 Example 4

Figure 27:
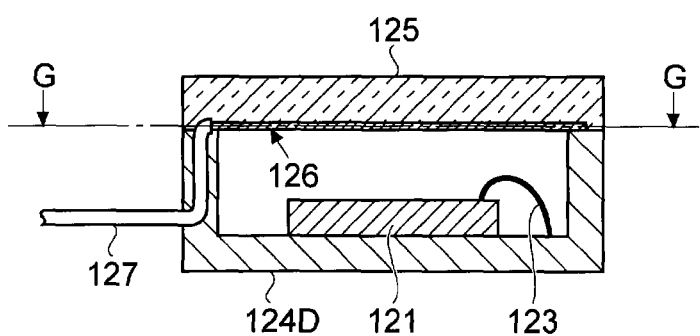
FIG. 27 is a vertical cross-sectional view depicting a configuration example of the case according to Example 4 of Embodiment 1.
Figure 28:
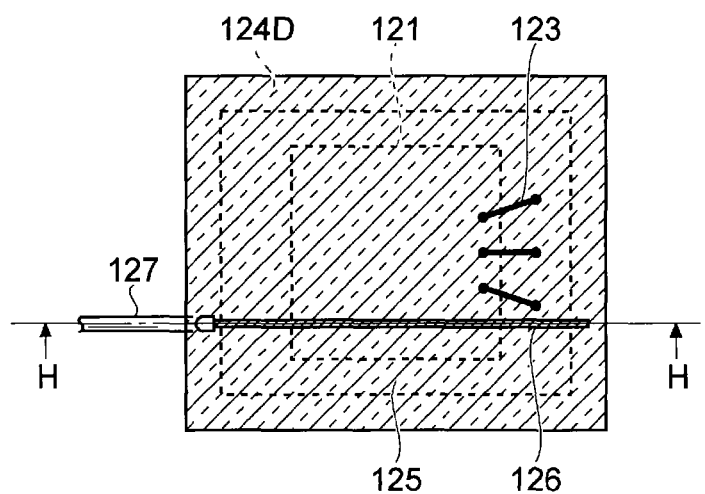
FIG. 28 is a horizontal cross-sectional view depicting a configuration example of the case according to Example 4 of Embodiment 1.

FIG. 27 and FIG. 28 are cross-sectional views depicting a configuration example of the case according to Example 4. FIG. 28 indicates an example of the cross-sectional structure at the G-G plane in FIG. 27, and FIG. 27 indicates an example of the cross-sectional structure at the H-H plane in FIG. 28.

As illustrated in FIG. 27 and FIG. 28, a case 124D according to Example 4 has a structure of supporting the four ends of the diffusion plate 125 from the rear surface 125a, for example, just like Example 3. In Example 4, however, a through hole to insert the optical fiber 127 is formed on one side wall of the case 124D.

The end of the optical fiber 127 inserted into the through hole comes out of the upper surface of this side wall, and is connected to the end of the optical guide unit 126 disposed on the diffusion plate 125. In this case, a concaved portion to house the end of the optical fiber 127 that comes out of the upper surface of the side wall may be formed in the diffusion plate 125.

In this configuration, it is preferable that an optical guide unit 126, none of which ends reach the end face of the diffusion plate 125, as illustrated in FIG. 27 and FIG. 28, is used for the optical guide unit 126. Thereby the leakage of the laser light L11 from the ends of the optical guide unit 126 can be reduced, and therefore the quantity of the laser light L11 that enters the detection region of the image sensor 131 via the optical fiber 127 is not reduced very much.

1.6.5 Example 5

Figure 29:
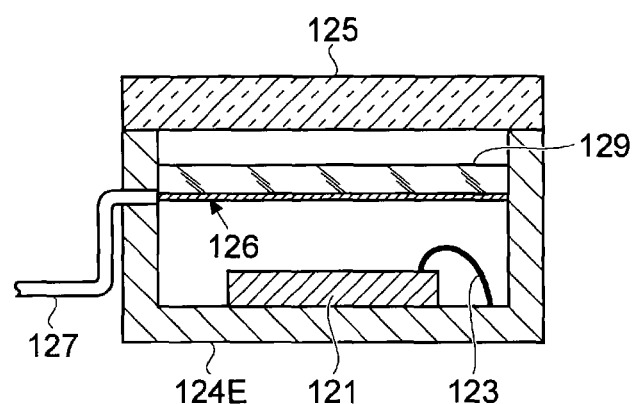
FIG. 29 is a vertical cross-sectional view depicting a configuration example of the case according to Example 5 of Embodiment 1.

FIG. 29 is a cross-sectional view depicting a configuration example of the case according to Example 5. Just like FIG. 4 and the like, FIG. 29 indicates an example of the cross-sectional structure at the vertical plane.

As illustrated in FIG. 29, a case 124E according to Example 5 has a configuration similar to the case 124D according to Example 4 illustrated in FIG. 27, where a glass substrate 129 is held between the light source 121 and the diffusion plate 125 inside the case 125E. Further, in Example 5, the optical guide unit 126 is disposed on the glass substrate 129 instead of the diffusion plate 125.

The glass substrate 129 is a cover member to protect the light source 121. By doubly covering the light source 121 by the diffusion plate 125 and the glass substrate 129 like this, the light source 121 is protected by the glass substrate 129 even if the diffusion plate 125 falls off, hence damage to the light source 121 itself can be prevented.

In Example 5, an example where the case 124D according to Example 4 is used as the base was described, but the case used as the base is not limited to this, and any case used in Embodiments 1 to 4 may be used.

Furthermore, in Example 5, an example where the glass substrate 129 is disposed between the light source 121 and the diffusion plate 125 was described, but the present technology is not limited to this configuration, and the diffusion plate 125 may be disposed between the light source 121 and the glass substrate 129, for example. In this case, the optical guide unit 126 may be disposed on the diffusion plate 125.

1.7 Functions and Effects

As described above, according to Embodiment 1, a part of the laser light L11 emitted from the light source 121 is guided to the detection region of the image sensor 131 via the optical guide unit 126 and the optical fiber 127. Thereby based on the quantity of the laser light L11 detected by the image sensor 131, an abnormality such as damage and peeling generated in the diffusion plate 125 can be accurately detected.

In the case of disposing the light-emitting unit 12 according to Embodiment 1 in the distance measuring device 10, a problem state, where sufficient quantity of irradiation light L1 cannot be applied to the distance measurement target region due to the abnormality generated in the diffusion plate 125, can be prevented with certainty, hence distance movement with even higher precision can be implemented. Furthermore, a problem state where strong light from the light source 121 directly enters human eyes due to the abnormality generated in the diffusion plate 125 can also be appropriately avoided.

1.8 Modifications

Modifications of Embodiment 1 will be described next with reference to a few examples.

1.8.1 Modification 1

Modification 1 will be described first. In Embodiment 1, an example where the quantity of the laser light L11 emitted from the light source 121 is detected using the image sensor 131 of the light-receiving unit 13 was described, but the present technology is not limited to this configuration, and the quantity of the laser light L11 may be detected using a light-receiving element that is different from the image sensor 131.

Figure 30:
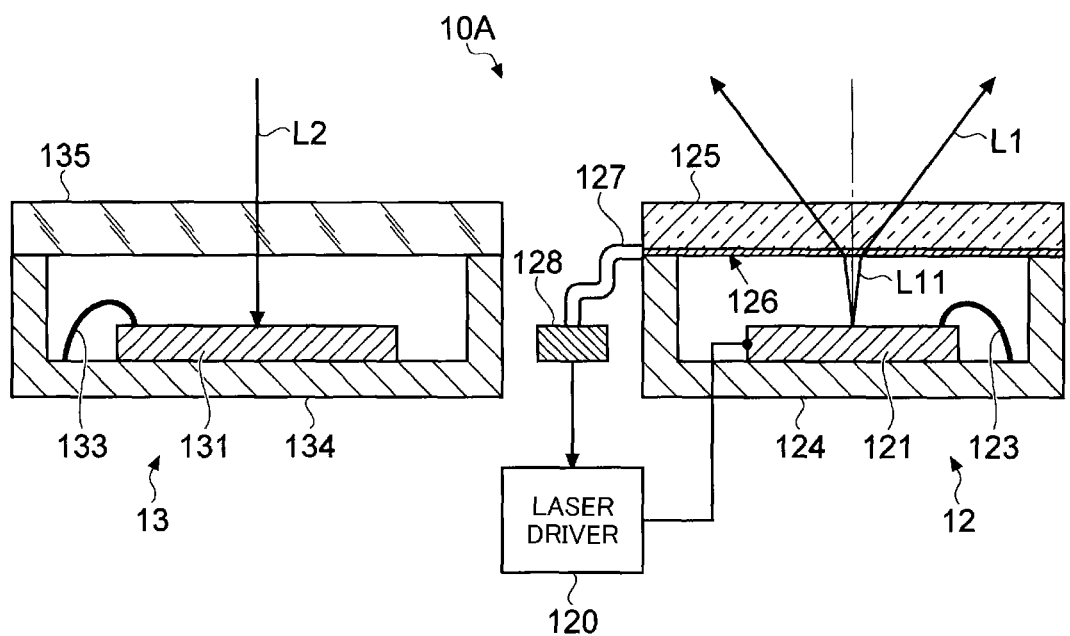
FIG. 30 is a cross-sectional view depicting a general configuration example of the light-emitting unit and the light-receiving unit according to Modification 1 of Embodiment 1.

FIG. 30 is a cross-sectional view depicting a general configuration example of the light-emitting unit and the light-receiving unit according to Modification 1 of Embodiment 1. Just like FIG. 4 and the like, FIG. 30 indicates an example of the cross-sectional structure at the vertical plane. In the configuration in FIG. 30, the laser driver 120 may be included in the light-emitting unit 12, or may be the control unit 11 in FIG. 1 itself, or may be included in the control unit 11.

As illustrated in FIG. 30, a distance measuring device 10A according to Modification 1 includes an optical sensor 128, such as a photodiode, disposed outside the case 124 of the light-emitting unit 12. The end of the optical fiber 127 contacts or comes close to the light-receiving surface of the optical sensor 128.

A part of the laser light L11 emitted from the light source 121 enters the optical sensor 128 via the optical guide unit 126 and the optical fiber 127. The optical sensor 128 is a detection unit that detects the quantity of the entered laser light L11, and inputs the light quantity information based on this detection result to the laser driver 120.

The laser driver 120 determines whether the abnormality is generated in the diffusion plate 125 based on the light quantity information input from the optical sensor 128, and drives the light source 121 based on this determination result.

As described above, it is possible to detect the abnormality generated in the diffusion plate 125 using the dedicated optical sensor 128, instead of the image sensor 131. In this case, the distance between the light-emitting unit 12 and the light-receiving unit 13 can be freely set, therefore the design flexibility of the distance measuring device using triangulation can be improved.

1.8.2 Modification 2

The configuration to detect the quantity of the laser light L11 described in the above mentioned Embodiment 1 and Modification 1 thereof can be used together with the configuration to detect the quantity of the laser light L11 using the optical sensor 122 disposed inside the case 124 of the light-emitting unit 12, as illustrated in FIG. 3, for example.

Figure 31:
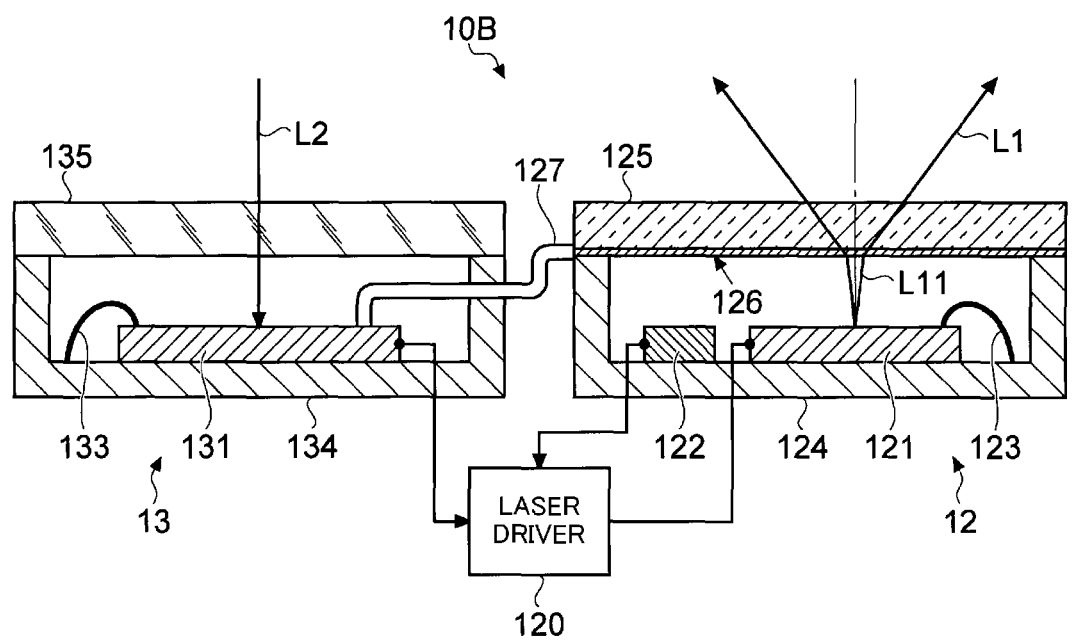
FIG. 31 is a cross-sectional view depicting a general configuration example of the light-emitting unit and the light-receiving unit according to Modification 2 of Embodiment 1.

For example, in Embodiment 1, the configuration illustrated in FIG. 4 and the configuration illustrated in FIG. 3 may be combined, as in the case of a distance measuring device 10B illustrated in FIG. 31. Further, the configuration illustrated in FIG. 30 in Modification 1 of Embodiment 1 and the configuration illustrated in FIG. 3 may be combined, as in the case of a distance measuring device 10C illustrated in FIG. 32.

Figure 32:
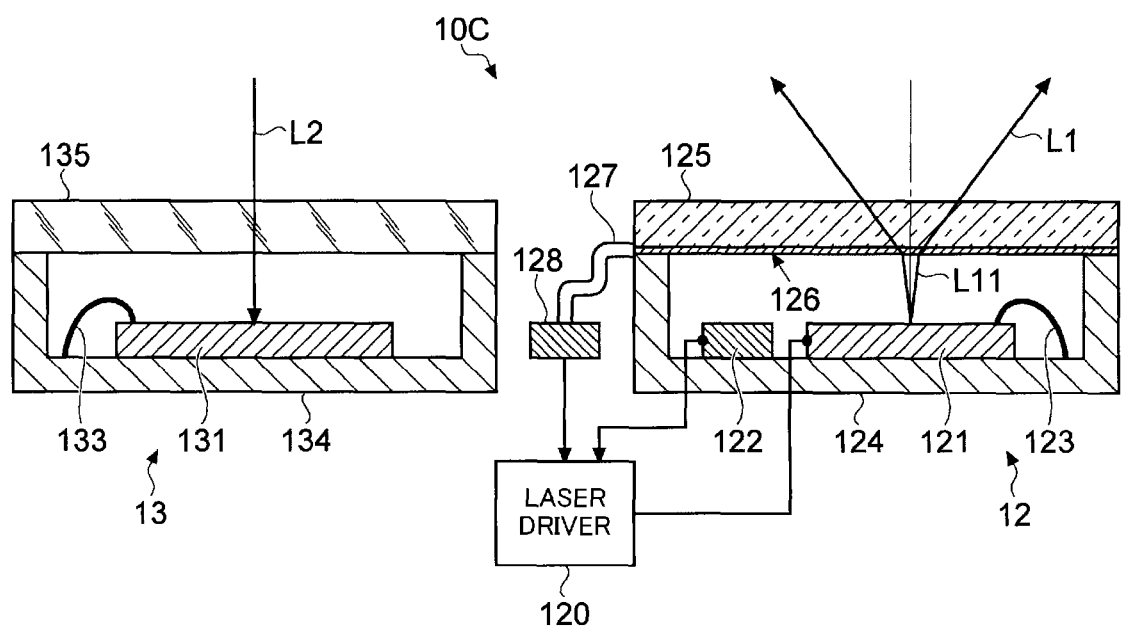
FIG. 32 is a cross-sectional view depicting another general configuration example of the light-emitting unit and the light-receiving unit according to Modification 2 of Embodiment 1.

For example, in the case of the configuration illustrated in FIG. 31 or FIG. 32, the abnormality generated in the diffusion plate 125 can be detected based on the quantity of the laser light L11 detected by the image sensor 131 or the optical sensor 128 in the normal operation, and if an abnormality is generated in the image sensor 131, the optical sensor 128, the optical fiber 127 or the like, and the image sensor 131 or the optical sensor 128 cannot detect the quantity of the laser light L11, the quantity of the laser light L11 can be detected using the optical sensor 122 inside the case 124, for example.

By using the above mentioned configuration, the abnormality generated in the diffusion plate 125 can be detected even if the abnormality is generated in the image sensor 131, the optical sensor 128, the optical fiber 127 or the like, hence the abnormality generated in the diffusion plate 125 can be detected with even higher certainty.

2. Embodiment 2

Embodiment 2 will be described in detail next with reference to the drawings. In the following description, a composing element or operation the same as Embodiment 1 or modifications thereof described above is denoted with the same reference sign, and redundant description thereof is omitted.

In Embodiment 1 and modifications thereof described above, an example where an abnormality generated in the diffusion plate 125 is detected based on the quantity of the laser light L11 detected via the optical guide unit 126 and the optical fiber 127 was described. In Embodiment 2, on the other hand, an example where the quantity of the laser light L11 output from the light source 121 is stabilized by performing feedback control for the light source 121 based on the quantity of the laser light L11 detected via the optical guide unit 126 and the optical fiber 127 will be described.

The functional configuration of the distance measuring device according to Embodiment 2 may be the same as the functional configuration of the distance measuring device 10 in Embodiment 1, for example, described with reference to FIG. 1 and the like, hence detailed description thereof will be omitted.

2.1 Configuration Example of Light-Emitting Unit and Light-Receiving Unit

Figure 33:
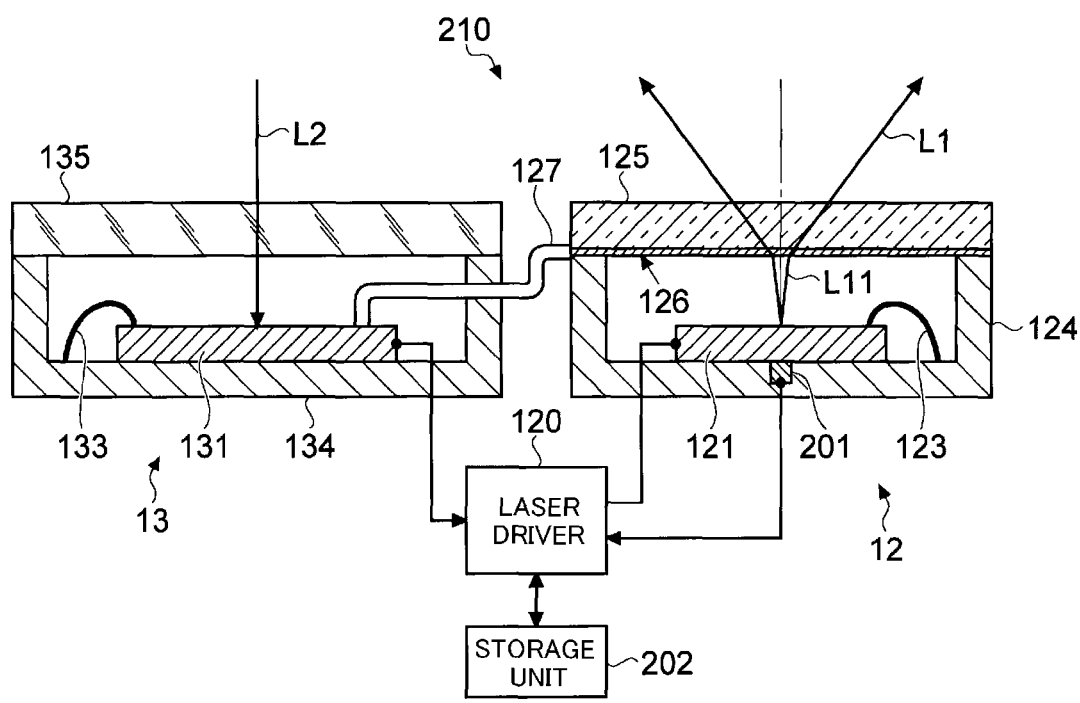
FIG. 33 is a cross-sectional view depicting a general configuration example of the light-emitting unit and the light-receiving unit according to Embodiment 2.

FIG. 33 is a cross-sectional view depicting a general configuration example of the light-emitting unit and the light-receiving unit according to Embodiment 2. FIG. 33 indicates an example of the cross-sectional structure at the vertical plane, just like FIG. 4, for example. In the configuration in FIG. 33, the laser driver 120 may be included in the light-emitting unit 12, or may be the control unit 11 in FIG. 1 itself, or may be included in the control unit 11.

As illustrated in FIG. 33, the distance measuring device 210 according to Embodiment 2 has a configuration similar to the configuration described with reference to FIG. 4 and the like, where a temperature sensor 201 that detects the temperature of the light source 121 is disposed inside the case 124 of the light-emitting unit 12, and a storage unit 202 is connected to the laser driver 120.

In the storage unit 202, the driving parameters for the light source 121 are stored for each temperature zone, for example. These driving parameters are parameters to output stable quantity of laser light L11 to the light source 121 even if the temperature of the light source 121 is changed, where such information as voltage value and voltage waveform of the driving voltage to drive the light source 121, for example, is registered for each temperature zone.

Based on the current temperature of the light source 121 detected by the temperature sensor 201, the laser driver 120 acquires the driving parameters corresponding to the temperature zone including the current temperature from the storage unit 202, and drives the light source 121 using the acquired driving parameters.

The driving parameters in the storage unit 202 may be stored in advance before shipment of the distance measuring device 210. The driving parameters in the storage unit 202 may be sequentially updated during operation of the distance measuring device 210. Further, the driving parameters in the storage unit 202 may be updated by calibration that is executed when the distance measuring device 210 is started up or executed on a regular basis.

2.2 Control Method

Figure 34:
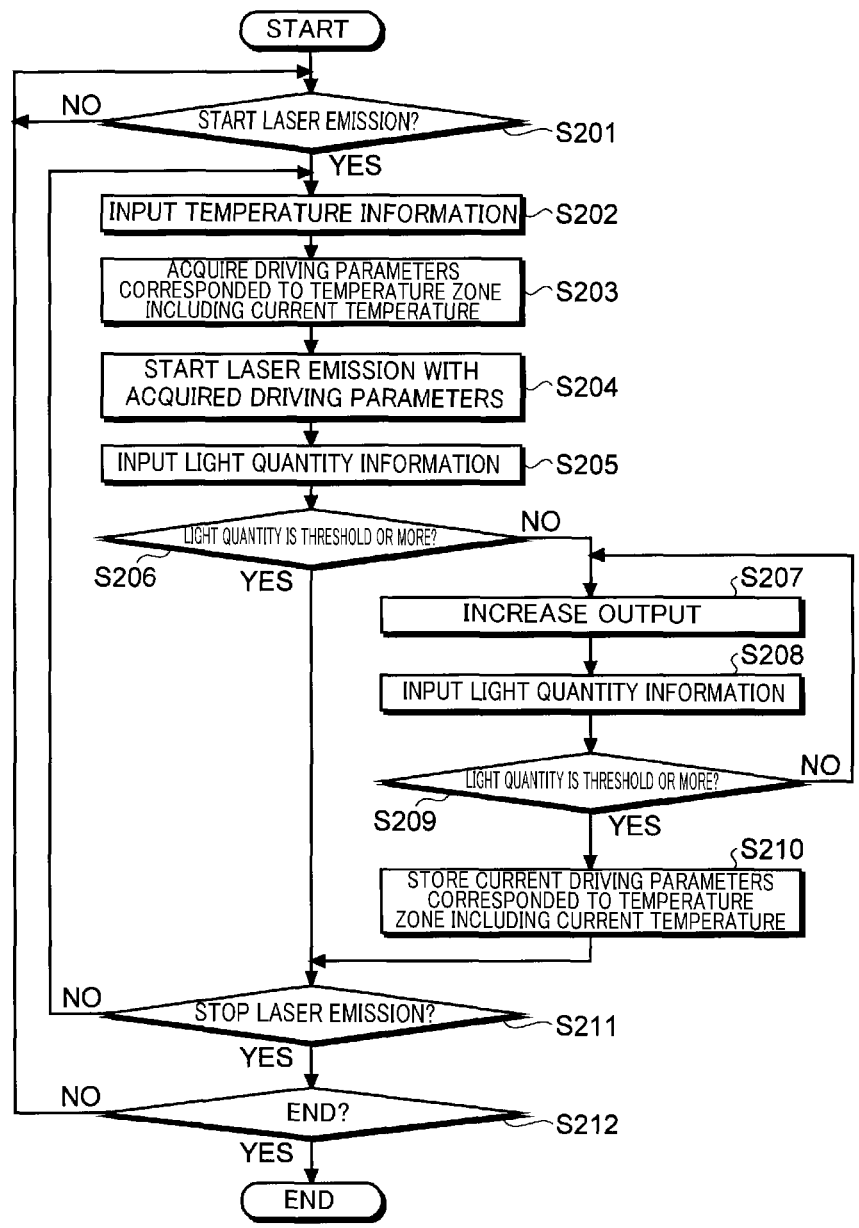
FIG. 34 is a flow chart depicting an example of a control method executed by a laser driver according to Embodiment 2.

FIG. 34 is a flow chart depicting an example of the control method executed by the laser driver according to Embodiment 2. The operation in FIG. 34 may be executed when the distance measuring device 210 is started up, for example.

As indicated in FIG. 34, in this operation, the laser driver 120 stands by until the start of laser emission is instructed by the control unit 11, for example (NO in step S201). When the start of laser emission is instructed (YES in step S201), the laser driver 120 inputs the information on the current temperature from the temperature sensor 201 (hereafter referred to as "temperature information"), for example (step S202).

Then the laser driver 120 acquires the driving parameters, which are pre-corresponded to the temperature zone including the temperature indicated by the input temperature information, from the storage unit 202 (step S203), and starts driving of the light source 121 using the acquired driving parameters (step S204).

Then the laser driver 120 inputs the light quantity information acquired in the detection region of the image sensor 131 (step S205), and determines whether the light quantity indicated by the input light quantity information is a predetermined light quantity threshold or more (step S206). The threshold in Embodiment 2 may be the light quantity information that is acquired in the detection region in the case where the diffusion plate 125 is normal and the light source 121 emits light at normal output, or the lower limit value thereof.

If the light quantity indicated by the light quantity information is the light source threshold or more (YES in step S206), the laser driver 120 advances the operation to step S211.

If the light quantity indicated by the light quantity information is less than the threshold (NO in step S206), the laser driver 120 updates the driving parameters so as to increase the output of the light source 121 (step S207). For example, the laser driver 120 increases the output of the light source 121 by increasing the driving current or driving voltage by a predetermined value.

Then the laser driver 120 inputs the light quantity information acquired in the detection region of the image sensor 131 after updating the driving parameters (step S208), and determines again whether the light quantity indicated by the input light quantity information is the light quantity threshold or more (step S209).

If the light quantity indicated by the light quantity information is less than the threshold (NO in step S209), the laser driver 120 returns the operation to step S207, and increases the output of the light source 121 again.

If the light quantity indicated by the light quantity information is the light source threshold or more (YES in step S209), on the other hand, the laser driver 120 stores the driving parameters after the update in the storage unit 202, so as to correspond to the temperature zone including the current temperature acquired in step S202 (step S210), then advances the operation to step S211.

In step S211, the laser driver 120 determines whether the laser emission of the light source 121 is stopped (step S211), and if the laser emission is not stopped (NO in step S211), the laser driver 120 returns the operation to step S202, and continues subsequent operations.

If the laser emission is stopped (YES in step S211), the laser driver 120 determines whether this operation is ended (step S212), and ends the operation if end is determined (YES in step S212). If end is not determined (NO in step S212), on the other hand, the laser driver 120 returns the operation to step S201, and stands by for the start of the next laser emission.

2.3 Functions and Effects

As described above, according to Embodiment 2, a part of the laser light L11 emitted from the light source 121 is guided to the detection region of the image sensor 131 via the optical guide unit 126 and the optical fiber 127, just like Embodiment 1. Thereby, based on the quantity of the laser light L11 detected by the image sensor 131, output of the light source 121 can be feedback-controlled. For example, even if the output of the light source 121 decreases due to the temperature rise of the light source 121, the driving parameters are updated so that the output of the light source 121 increases. As a result, output of the light source 121 can be stabilized.

In Embodiment 2, an example of outputting a stable quantity of laser light L11 to the light source 121 by changing the driving parameters in accordance with the current temperature was described, but the present technology is not limited to such control, and the above mentioned Embodiment 2 can be applied even when the quantity of the laser light L11 output by the light source 121 is changed in accordance with the size (e.g. distance in the forward direction) of the distance measurement target range specified by the distance measuring device 210, for example.

The other configurations, operations and effects may be the same as the above mentioned Embodiment 1, hence detailed description thereof is omitted here.

3. Application Examples

The technique according to the present disclosure can be applied to various products. For example, the technique according to this disclosure may be implemented as a device that is mounted in various types of mobile bodies, such as an automobile, electric car, hybrid electric car, motorcycle, bicycle, personal mobility, airplane, drone, ship, robot, construction machine and agricultural machine (tractor).

Figure 35:
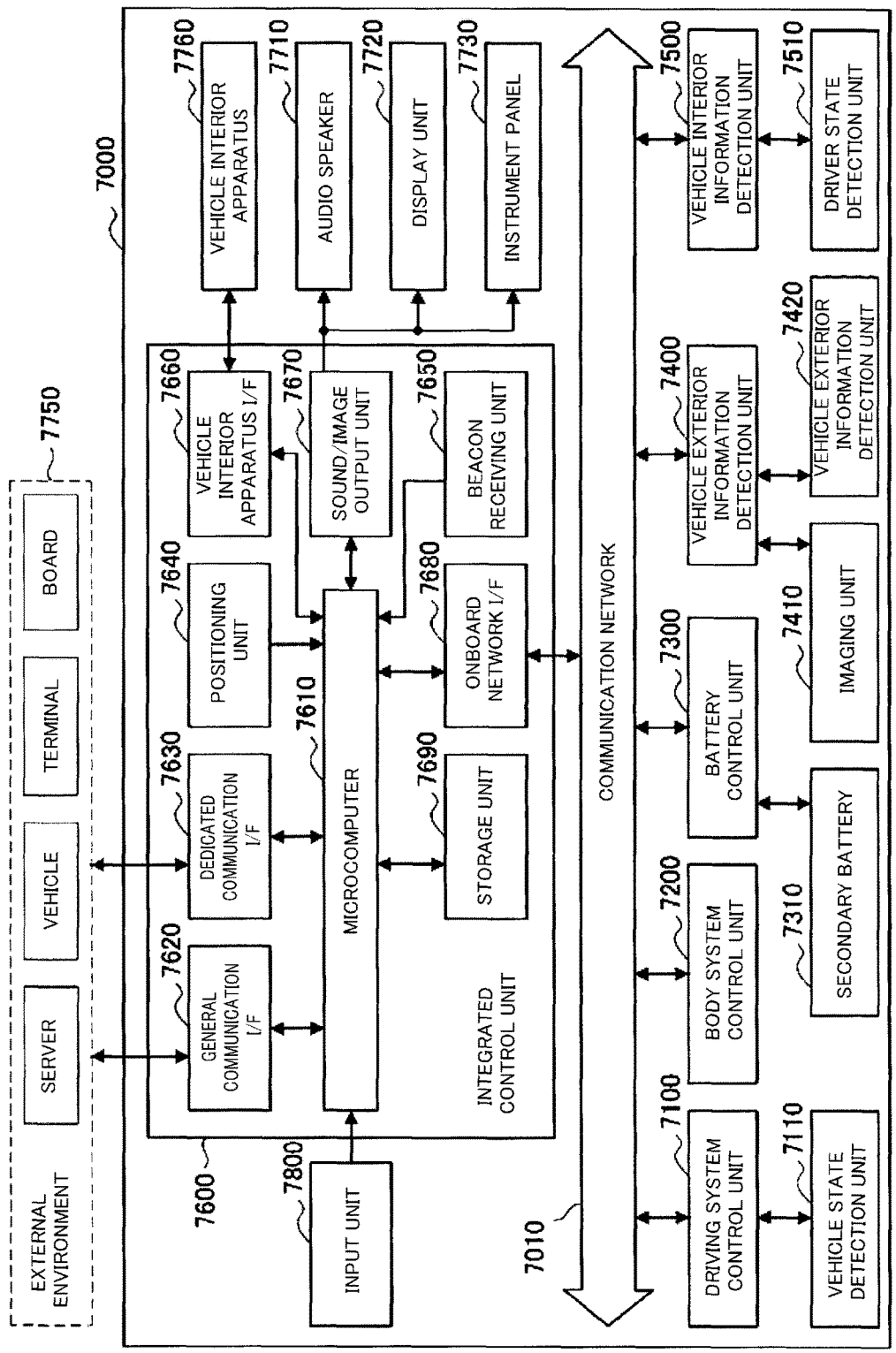
FIG. 35 is a block diagram depicting an example of a general configuration of a vehicle control system.

FIG. 35 is a block diagram depicting an example of a general configuration of a vehicle control system 7000, which is an example of a mobile body control system to which the technique according to the present disclosure can be applied. The vehicle control system 7000 includes a plurality of electronic control units which are connected via a communication network 7010. In the example indicated in FIG. 35, the vehicle control system 7000 includes a driving system control unit 7100, a body system control unit 7200, a battery control unit 7300, a vehicle exterior information detection unit 7400, a vehicle interior information detection unit 7500 and an integrated control unit 7600. The communication network 7010 that connects these plurality of control units may be an on-board communication network conforming to such standards as the controller area network (CAN), the local interconnect network (LIN), the local area network (LAN) or FlexRay (registered trademark).

Each control unit includes a microcomputer that performs arithmetic processing according to various programs, a storage unit that stores programs executed by the microcomputer, parameters used for various operations, or the like, and a drive circuit that drives various control target devices. Each control unit also includes a network I/F to communicate with other control units via the communication network 7010, and a communication I/F to communicate with devices and sensors inside/outside the vehicle via cable communication or wireless communication. In FIG. 35, as the functional configuration of the integrated control unit 7600, a microcomputer 7610, a general communication I/F 7620, a dedicated communication I/F 7630, a positioning unit 7640, a beacon receiving unit 7650, a vehicle interior apparatus I/F 7660, a sound/image output unit 7670, an on-board network I/F 7680 and a storage unit 7690 are indicated. The other control units also include a microcomputer, a communication I/F, a storage unit and the like.

The driving system control unit 7100 controls the operations of devices related to the driving system of the vehicle in accordance with various programs. For example, the driving system control unit 7100 functions as a control device, such as a driving force generation device that generates the driving force of a vehicle (e.g. internal combustion engine, motor for driving), a driving force transmission mechanism that transmits the driving force to the wheels, a steering mechanism that adjusts a steering angle of the vehicle, and a braking device that generates a braking force of the vehicle. The driving system control unit 7100 may include functions of such a control device as an anti-lock brake system (ABS) or an electronic stability control (ESC).

A vehicle state detection unit 7110 is connected to the driving system control unit 7100. The vehicle state detection unit 7110 includes at least one of a gyro-sensor that detects the angular velocity of the axial rotation motion of the car body, an acceleration sensor that detects the acceleration of the vehicle, and sensors that detect the operation amount of the accelerator pedal, the operation amount of the brake pedal, the steering angle of the steering wheel, the engine speed, the rotation speed of the wheels and the like, for example. The driving system control unit 7100 performs arithmetic processing using signals that are input from the vehicle state detection unit 7110, and controls the internal combustion engine, the motor for driving, the electric power steering drive, the brake device and the like.

The body system control unit 7200 controls the operations of various devices mounted in the vehicle in accordance with various programs. For example, the body system control unit 7200 functions as a control device of a keyless entry system, a smart key system, a power window device or various lights (e.g. head lights, back lights, brake lights, blinkers, fog lights). In this case, radio waves transmitted from a portable unit which replaces a key or signals of various switches can be input to the body system control unit 7200. The body system control unit 7200 receives the input of these radio waves or signals, and controls a door lock device, a power window device, lights and the like of the vehicle.

The battery control unit 7300 controls a secondary battery 7310, which is a power supply source of the motor for driving in accordance with various programs. For example, such information as the battery temperature, the battery output voltage and the residual capacity of the battery is input to the battery control unit 7300 from a battery device which includes the secondary battery 7310. The battery control unit 7300 performs arithmetic processing using these signals, and controls temperature adjustment of the secondary battery 7310, or controls the cooling device and the like included in the battery device.

The vehicle exterior information detection unit 7400 detects information outside the vehicle equipped with the vehicle control system 7000. For example, at least one of an imaging unit 7410 and a vehicle exterior information detection unit 7420 is connected to the vehicle exterior information detection unit 7400. The imaging unit 7410 includes at least one of a Time-of-Flight (ToF) camera, a stereo camera, a single lens camera, and infrared camera and other cameras. The vehicle exterior information detection unit 7420 includes at least one of an environment sensor that detects current weather or meteorology data, and a surrounding information detection sensor that detects other vehicles, obstacles and pedestrians around this vehicle equipped with the vehicle control system 7000, for example.

The environment sensor may be at least one of a raindrop sensor that detects rain fall, a fog sensor that detects fog, a sunshine sensor that detects the degree of sunshine, and a snow sensor that detects snow fall. The surrounding information detection sensor may be at least one of an ultrasonic sensor, a radar device and a LIDAR (Light Detection and Ranging, or Laser Imaging Detection and Ranging) device.

The imaging unit 7410 and the vehicle exterior information detection unit 7420 may be installed as independent sensors and devices, or may be installed as a device integrating a plurality of sensors and devices.

Figure 36:
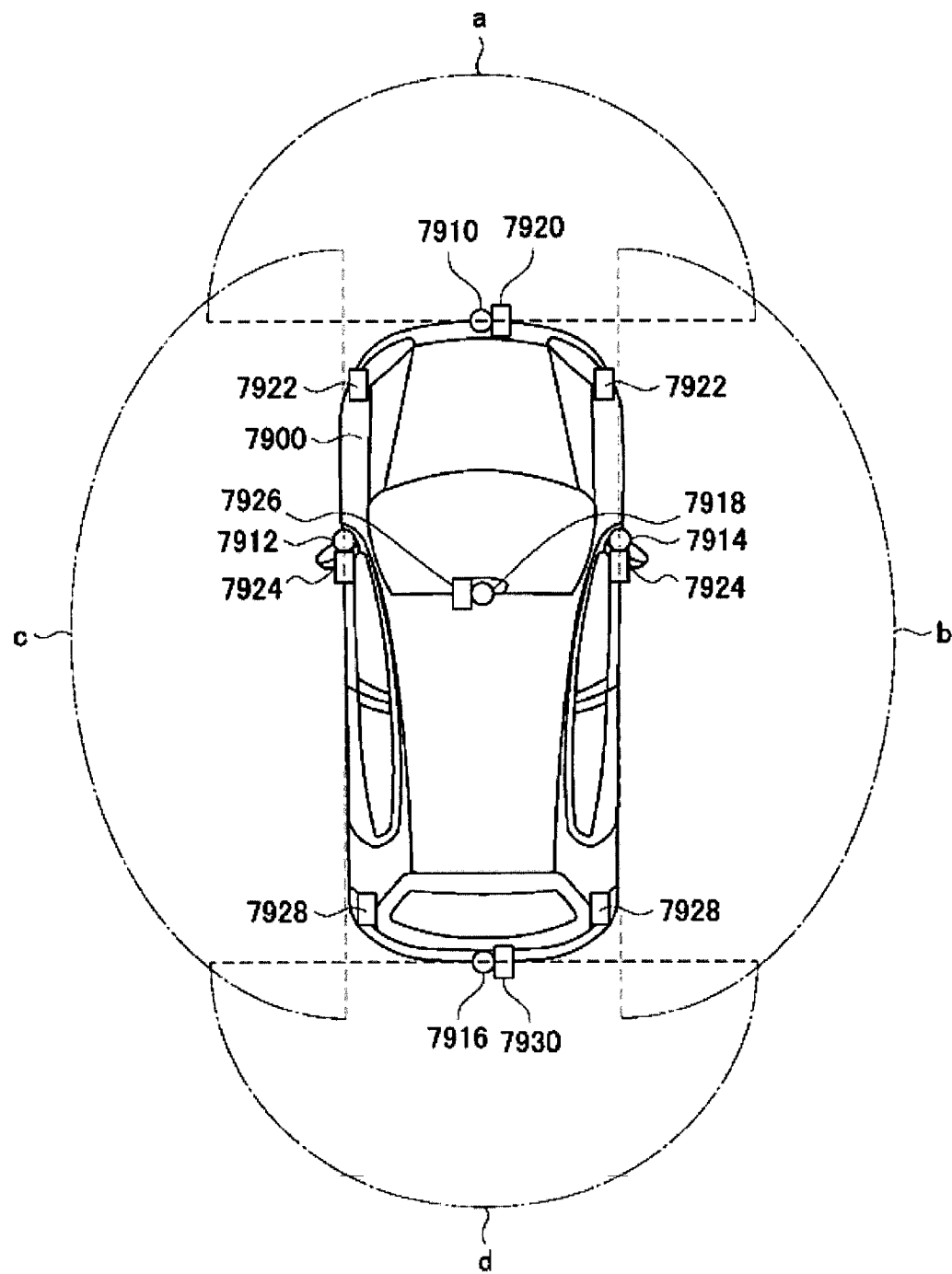
FIG. 36 is a diagram depicting an example of installing positions of a vehicle exterior information detection unit and an imaging unit.

Here FIG. 36 indicates an example of installing positions of the imaging unit 7410 and the vehicle exterior information detection unit 7420. The imaging unit 7910, 7912, 7914, 7916 or 7918 is disposed at least on one of the positions of the front noise, side mirror, rear bumper and back door of the vehicle 7900, and an upper area of the windshield in the vehicle interior. An imaging unit 7910 disposed on the front nose and the imaging unit 7918 disposed on the upper area of the windshield in the vehicle interior mainly acquire images of an area in front of the vehicle 7900. The imaging units 7912 and 7914 disposed on the side mirror mainly acquire images of the side areas of the vehicle 7900. The imaging unit 7916 disposed on the rear bumper or the back door mainly acquire images of an area behind the vehicle 7900. The imaging unit 7918 disposed on the upper area of the windshield in the vehicle interior mainly is used for detecting a preceding vehicle, pedestrian, obstacle, traffic light, traffic sign, traffic lane or the like.

FIG. 36 indicates examples of the image capturing ranges of the imaging units 7910, 7912, 7914 and 7916 respectively. The imaging range a indicates an imaging range of the imaging unit 7910 disposed on the front nose, the imaging ranges b and c indicate the imaging ranges of the imaging units 7912 and 7914 disposed on the side mirrors respectively, and the imaging range d indicates the imaging range of the imaging unit 7916 disposed on the rear bumper or the back door. For example, a bird's eye view viewing the vehicle 7900 from above is acquired by integrating the image data acquired by the imaging units 7910, 7912, 7914 and 7916.

The vehicle exterior information detection units 7920, 7922, 7924, 7926, 7928 and 7930, which are disposed on the front, rear, sides and corners of the vehicle 7900, and on an upper area of the windshield in the vehicle interior, may be ultrasonic sensors or radar devices, for example. The vehicle exterior information detection units 7920, 7926 and 7930, which are disposed on the front nose, rear bumper and backdoor of the vehicle 7900 and on an upper area of the windshield in the vehicle interior, may be LIDAR devices, for example. These vehicle exterior information detection units 7920 to 7930 are used mainly for detecting preceding vehicles, pedestrians, obstacles or the like.

Description will continue referring back to FIG. 35. The vehicle exterior information detection unit 7400 causes the imaging unit 7410 to capture an image outside the vehicle and receive the captured image data. Further, the vehicle exterior information detection unit 7400 receives detection information from the connected vehicle exterior information detection unit 7420. In a case where the vehicle exterior information detection unit 7420 is an ultrasonic sensor, a radar device or an LIDAR device, the vehicle exterior information detection unit 7400 transmits ultrasonic waves, electromagnetic waves or the like, and receives information on the reflected waves thereof. Based on the received information, the vehicle exterior information detection unit 7400 may perform object detection processing or distance detection processing for people, vehicles, obstacles, traffic signs, writing on the road surface and the like. The vehicle exterior information detection unit 7400 may also perform environment recognition processing to recognize rain, fog, road surface conditions and the like, based on the received information. Further, based on the received information, the vehicle exterior information detection unit 7400 may calculate a distance to an object outside the vehicle.

Furthermore, based on the received image data, the vehicle exterior information detection unit 7400 may perform image recognition processing to recognize people, vehicles, obstacles, traffic signs, writing on the road surface or the like, or distance detection processing thereof. The vehicle exterior information detection unit 7400 may perform such processing as distortion correction, positioning or the like on the received image data, and may generate a bird's eye view image or a panoramic image by combining image data captured by different imaging units 7410. The vehicle exterior information detection unit 7400 may also perform view point conversion processing using image data captured by different imaging units 7410.

The vehicle interior information detection unit 7500 detects information inside the vehicle. A driver state detection unit 7510 that detects the state of the driver, for example, is connected to the vehicle interior information detection unit 7500. The driver state detection unit 7510 may include a camera that captures images of the driver, a biosensor that detects bio-information on the driver, a microphone that picks up sound inside the vehicle interior or the like. The bio-sensor is disposed on a seat, a steering wheel or the like, for example, and detects bio-information on an occupant sitting in the passenger seat or the driver holding the steering wheel. The vehicle interior information detection unit 7500 may calculate the degree of fatigue or degree of concentration of the driver, or determine whether the driver is falling asleep, based on the detected information which is input from the driver state detection unit 7510. The vehicle interior information detection unit 7500 may perform such processing as noise cancelling on sound signals that are picked up.

The integrated control unit 7600 controls the operation in the vehicle control system 7000 in general in accordance with various programs. An input unit 7800 is connected to the integrated control unit 7600. The input unit 7800 may be implemented by a device with which the occupant can perform an input operation, such as a touch panel, buttons, microphone, switches, a lever and the like. The data acquired by voice recognition of the sound input via the microphone may be input to the integrated control unit 7600. The input unit 7800 may be, for example, a remote control device that uses infrared or other radio waves, or may be an externally connected apparatus, such as a portable telephone or personal digital assistant (PDA) supporting the operation of the vehicle control system 7000. The input unit 7800 may be a camera, for example, and in this case, the occupant may input information by gesture. Further, the data acquired by detecting the motion of a wearable device worn by the occupant may be input. Furthermore, the input unit 7800 may include an input control circuit or the like that generates input signals based on information which an occupant or the like input using the above mentioned input unit 7800, and outputs the input signals to the integrated control unit 7600, for example. By operating this input unit 7800, the occupant or the like inputs various data or instructs a processing operation to the vehicle control system 7000.

The storage unit 7690 may include a read only memory (ROM) that stores various programs executed by the microcomputer, and a random access memory (RAM) that stores various parameters, operation results, sensor values and the like. The storage unit 7690 may be implemented by a magnetic storage device, such as a hard disk drive (HDD), a semiconductor storage device, an optical storage device, a magneto-optical storage device or the like.

The general communication I/F 7620 is a general communication I/F that mediates the communication with various apparatuses existing in an external environment 7750. The general communication I/F 7620 may use cellular communication protocols, such as Global System of Mobile Communications (GSM) (registered trademark), WiMAX (registered trademark), Long Term Evolution (LTE) (registered trademark) and LTE-Advanced (LTE-A) or other wireless communication protocols, such as wireless LAN (also referred to as Wi-Fi (registered trademark)) and Bluetooth (registered trademark). The general communication I/F 7620 may be connected to an apparatus (e.g. application server or control server) on an external network (e.g. Internet, cloud network, company-specific network) via a base station or an access point. The general communication I/F 7620 may be connected to a terminal near the vehicle (e.g. a terminal of a driver, pedestrian or store, or a machine type communication (MTC) terminal) using a peer-to-peer (P2P) technique, for example.

The dedicated communication I/F 7630 is a communication I/F that supports a communication protocol standardized for use in a vehicle. For the dedicated communication I/F 7630, WAVE (Wireless Access in Vehicle Environment) which is a combination of IEEE802.11p for lower layer and IEEE1609 for upper layer, DSRC (Dedicated Short Range Communication), or such a standard protocol as a cellular communication protocol may be used. Typically the dedicated communication I/F 7630 performs V2X communication, which is a concept including at least one of the vehicle to vehicle communication, the vehicle to infrastructure communication, the vehicle to home communication and the vehicle to pedestrian communication.

The positioning unit 7640 receives a global navigation satellite system (GNSS) signal from the GNSS satellite (e.g. a global positioning system (GPS) signal from the GPS satellite), executes the positioning, and generates position information including latitude, longitude and altitude of the vehicle. The positioning unit 7640 may specify the current position by exchanging signals with a wireless access point, or may acquire position information using a terminal having a positioning functions, such as a portable telephone, PHS and smartphone.

The beacon receiving unit 7650 receives a radio wave or an electromagnetic wave transmitted from a wireless station or the like installed along a road, and acquires such information as a current position, congestion, road closings and required time. The function of the beacon receiving unit 7650 may be included in the dedicated communication I/F 7630 mentioned above.

The vehicle interior apparatus I/F 7660 is a communication interface that mediates connection between the microcomputer 7610 and various vehicle interior apparatuses 7760 existing inside the vehicle. The vehicle interior apparatus I/F 7660 may establish wireless communication using such wireless communication protocols as wireless LAN, Bluetooth (registered trademark) NFC (Near Field Communication or WUSB (Wireless Universal Serial Bus). Further, the vehicle interior apparatus I/F 7660 may establish such cable connection as USB (universal serial bus), HDMI (High-Definition Multimedia Interface) (registered trademark), and MHL (Mobile High-definition Link). The vehicle interior apparatus 7760 may include at least one of a mobile apparatus or a wearable apparatus worn by an occupant, and an information apparatus that is brought in or installed in the vehicle. The vehicle interior apparatus 7760 may include a navigation device which searches the route to an arbitrary destination. The vehicle interior apparatus I/F 7660 exchanges control signals or data signals with these vehicle interior apparatuses 7760.

The on-board network I/F 7680 is an interface that mediates communication between the microcomputer 7610 and the communication network 7010. The on-board network I/F 7680 transmits/receives signals in accordance with a predetermined protocol supported by the communication network 7010.

The microcomputer 7610 of the integrated control unit 7600 controls the vehicle control system 7000 in accordance with various programs based on the information acquired by at least one of the general communication I/F 7620, the dedicated communication I/F 7630, the positioning unit 7640, the beacon receiving unit 7650, the vehicle interior apparatus I/F 7660 and the on-board network I/F 7680. For example, the microcomputer 7610 may calculate the control target value of the driving force generation device, the steering mechanism or the braking device based on the acquired information inside or outside the vehicle, and output a control command to the driving system control unit 7100. For example, the microcomputer 7610 may perform cooperative control to implement the functions of the advanced driver assistance system (ADAS), including collision avoidance or shock absorption of the vehicle, following travel based on the vehicle distance, vehicle speed maintaining travel, vehicle collision warning and lane deviation warning. Further, the microcomputer 7610 may perform cooperative control for automatic driving, to automatically travel without driver control, by controlling the driving force generation device, the steering mechanism, the braking device or the like based on the acquired information around the vehicle.

The microcomputer 7610 may generate three-dimensional distance information between the vehicle and such objects as structures and pedestrians in the surroundings, and create local map information including the surrounding information of the vehicle at the current position, based on information that is acquired by at least one of the general communication I/F 7620, the dedicated communication I/F 7630, the positioning unit 7640, the beacon receiving unit 7650, the vehicle interior apparatus I/F 7660 and the on-board network I/F 7680. Further, the microcomputer 7610 may predict danger, such as collision with a vehicle, close approaching of a pedestrian, entry to a closed road, and the like, based on the acquired information, and generate warning signals. The warning signals may be signals to generate warning sounds or to turn a warning lamp ON.

The sound/image output unit 7670 sends the output signals of at least one of sound and image to an output device which can visually or audibly notify information to an occupant of the vehicle or to outside the vehicle. In the example in FIG. 35, the audio speaker 7710, the display unit 7720, and the instrument panel 7730 are indicated as the output devices. The display unit 7720 may include at least one of an on-board display and a head up display. The display unit 7720 may include an augmented reality (AR) display function. The output device may be a device other than these devices, including headphones, a wearable device such as a spectacle type display worn by an occupant, a projector and a lamp. In the case where the output device is a display device, the display device visually displays the result acquired by various processings that the microcomputer 7610 performed, or information received from other control units, in various forms including text, images, tables and graphs. In the case where the output device is a sound output device, the sound output device converts the audio signals of the reproduced sound data or acoustic data into analog signals, and audibly outputs the analog signals.

In the example indicated in FIG. 35, at least two control units connected via the communication network 7010 may be integrated as one control unit. Further, an individual control unit may be constituted of a plurality of control units. Furthermore, the vehicle control system 7000 may include other control units that are not indicated in FIG. 35. In the above description, a part or all of the functions of any one of the control units may be performed by a different control unit. In other words, as long as the information is transmitted/received via the communication network 7010, a predetermined arithmetic processing may be performed by any of the control units. In the same manner, a sensor or a device connected to any of the control units may be connected to a different control unit, or a plurality of control units may transmit/receive detected information with each other via the communication network 7010.

A computer program to implement each function of the distance measuring device 10 according to the embodiment described with FIG. 1 may be installed in any of the control units. Furthermore, a computer-readable recording medium in which this computer program is stored may be provided. The recording medium is a magnetic disk, an optical disk, a magneto-optical disk, a flash memory or the like. The computer program may also be distributed via a network, for example, without using a recording medium.

In the vehicle control system 7000 described above, the distance measuring device 10 according to the embodiment described with reference to FIG. 1 may be applied to the integrated control unit 7600 of the application example indicated in FIG. 35. For example, the control unit 11 and the input/output unit 14 of the distance measuring device 10 correspond to the microcomputer 7610, the storage unit 7690 and the on-board network I/F 7680 of the integrated control unit 7600.

At least a part of the composing elements of the distance measuring device 10 according to the embodiment described with reference to FIG. 1 may be implemented as a module for the integrated control unit 7600 indicated in FIG. 35 (e.g. integrated circuit module constituted of one die). Further, the distance measuring device 10 according to the embodiment described with reference to FIG. 1 may be implemented by a plurality of control units of the vehicle control system 7000 indicated in FIG. 35.

Embodiments of the present disclosure have been described, but the technical scope of the present disclosure is not strictly limited to the embodiment described above, but may be modified in various ways within a scope of not departing from the essence of the present disclosure. Furthermore, the composing elements of different embodiments or modifications may be combined appropriately.

The effects of each embodiment described in the present description are merely examples, and other effects may be implemented.

The present technique may take the following configurations.

(1)

A light source module, including:

a light source;

a case that houses the light source and includes an emission opening through which light emitted from the light source is emitted;

a cover member that is disposed at the emission opening of the case and through which the light emitted from the light source is transmitted;

a wave guide that guides a part of the light, which is emitted from the light source, in a direction that is different from the traveling direction of the light emitted from the light source;

a detection unit that detects the quantity of the light guided via the wave guide; and driving unit that drives the light source based on the quantity of the light detected by the detection unit.

(2)

The light source module according to the above (1), wherein the wave guide includes an optical guide unit that is disposed in the cover member and guides a part of the light emitted from the light source in the direction that is different from the traveling direction.

(3)

The light source module according to the above (2), wherein the optical guide unit is disposed in the cover member on a surface facing the light source.

(4)

The light source module according to the above (2), wherein the optical guide unit is disposed in the cover member on the surface on the opposite side of the light source.

(5)

The light source module according to any one of the above (2) to (4), wherein the optical guide unit is a slit type groove formed in the cover member.

(6)

The light source module according to any one of the above (2) to (4), wherein the optical guide unit is a mesa type structure which protrudes in a convex shape from the cover member.

(7)

The light source module according to any one of the above (2) to (6), wherein the optical guide unit linearly extends from one end face of the cover member.

(8)

The light source module according to any one of the above (2) to (6), wherein the optical guide unit includes a linear-shaped first optical guide and a linear-shaped second optical guide which crosses with the first optical guide.

(9)

The light source module according to any one of the above (2) to (6), wherein the optical guide unit is curved.

(10)

The light source module according to any one of the above (2) to (9), wherein at least a part of the optical guide unit is disposed inside an effective region of the light emitted from the light source.

(11)

The light source module according to any one of the above (2) to (9), wherein the optical guide unit is disposed outside an effective range of the light emitted from the light source.

(12)

The light source module according to any one of the above (2) to (11), wherein one end of the optical guide unit reaches a first end face of the cover member, and the first end face of the cover member contacts with an inner side wall of the case.

(13)

The light source module according to any one of the above (2) to (11), wherein one end of the optical guide unit reaches a first end face of the cover member, and the first end face of the cover member is open.

(14)

The light source module according to any one of the above (1) to (13), wherein the cover member is a diffusion plate that diffuses the light emitted from the light source.

(15)

The light source module according to any one of the above (1) to (13), wherein the cover member includes a glass substrate through which the light emitted from the light source transmits, and a diffusion plate that diffuses the light transmitted through the glass substrate, and a part of the wave guide is disposed on the glass substrate.

(16)

The light source module according to any one of the above (1) to (15), wherein the detection unit is a solid-state imaging device, and the wave guide guides a part of the light emitted from the light source to a part of a light-receiving region in the solid-state imaging device.

(17)

The light source module according to any one of the above (1) to (15), wherein the detection unit is a light-receiving element.

(18)

A distance measuring device including:

a light-emitting unit;

a light-receiving unit; and a control unit that calculates a distance to an object based on reflected light of light emitted from the light-emitting unit, out of light detected by the light-receiving unit, wherein the light-emitting unit further includes:

a light source;

a case that houses the light source and includes an emission opening through which light emitted from the light source is emitted;

a cover member that is disposed at the emission opening of the case and through which the light emitted from the light source is transmitted;

a wave guide that guides a part of the light emitted from the light source in a direction that is different from the traveling direction of the light emitted from the light source;

a detection unit that detects the quantity of the light guided via the wave guide; and a driving unit that drives the light source based on the quantity of the light detected by the detection unit.

(19)

A control method for controlling a light source module which includes:

a light source;

a case that houses the light source and includes an emission opening through which light emitted from the light source is emitted;

a cover member that is disposed at the emission opening of the case and through which the light emitted from the light source is transmitted;

a wave guide that guides a part of the light, which is emitted from the light source, in a direction that is different from the traveling direction of the light emitted from the light source;

a detection unit that detects the quantity of the light guided via the wave guide; and a driving unit that drives the light source based on the quantity of the light detected by the detection unit, wherein the driving unit stops emission of the light source in a case where the quantity of the light detected by the detection unit is lower than a predetermined threshold.

(20)

A control method for controlling a light source module which includes:

a light source;

a case that houses the light source and includes an emission opening through which light emitted from the light source is emitted;

a cover member that is disposed at the emission opening of the case and through which the light emitted from the light source is transmitted;

a wave guide that guides a part of the light, which is emitted from the light source, in a direction that is different from the traveling direction of the light emitted from the light source;

a detection unit that detects the quantity of the light guided via the wave guide; and a driving unit that drives the light source based on the quantity of the light detected by the detection unit, wherein the driving unit increases output of the light source in a case where the quantity of the light detected by the detection unit is lower than a predetermined threshold.

REFERENCE SIGNS LIST 10, 10A, 210 Distance measuring device
11 Control unit
12 Light-emitting unit
13 Light-receiving unit
14 Input/output unit
20 Object
120 Laser driver
121 Light source
122, 128 Optical sensor
123, 133 Wiring
124, 124A, 124B, 124C, 124D, 124E, 134 Case
124a Opening
124b Side wall
125 Diffusion plate
125a Rear surface
125b Front surface
126 Optical guide unit
126a, 126b Optical guide
127 Optical fiber
129, 135 Glass substrate
131 Image sensor
201 Temperature sensor
202 Storage unit
L1 Irradiation light
L2 Reflected light
L11 Laser light

The invention claimed is:

1. A light source module, comprising:

a light source;

a case that houses the light source, wherein
the case includes an emission opening, and
the light source is configured to emit light through the emission opening of the case;

a cover member comprising a glass substrate and a diffusion plate configured to transmit the emitted light, wherein the cover member is at the emission opening of the case;

a wave guide configured to guide a part of the emitted light in a specific direction, wherein
the specific direction is different from a traveling direction of the emitted light,
the wave guide includes an optical guide unit that is on the cover member, the optical guide unit extends linearly from one of a first end face of the cover member or a second end face of the cover member, and
the second end face of the cover member is different from the first end face of the cover member;
a detection unit configured to detect a quantity of the guided part of the emitted light; and
a driving unit configured to drive the light source based on the detected quantity of the guided part of the emitted light.

2. The light source module according to claim 1, wherein the optical guide unit is configured to guide the part of the emitted light in the specific direction.

3. The light source module according to claim 2, wherein the optical guide unit is on a surface of the cover member, and
the surface of the cover member faces the light source.

4. The light source module according to claim 2, wherein the optical guide unit is on a surface of the cover member, and
the surface of the cover member is opposite to the light source.

5. The light source module according to claim 2, wherein the optical guide unit is a slit type groove in the cover member.

6. The light source module according to claim 2, wherein the optical guide unit is a mesa type structure, and
the optical guide unit protrudes, in a convex shape, from the cover member.

7. The light source module according to claim 2, wherein the optical guide unit includes a first optical guide and a second optical guide,
the second optical guide crosses the first optical guide, and
each of the first optical guide and the second optical guide is of a linear shape.

8. The light source module according to claim 2, wherein the optical guide unit is curved.

9. The light source module according to claim 2, wherein at least a part of the optical guide unit is inside an effective region of the emitted light.

10. The light source module according to claim 2, wherein the optical guide unit is outside an effective range of the emitted light.

11. The light source module according to claim 2, wherein one of a first end of the optical guide unit or a second end of the optical guide unit reaches the first end face of the cover member,
the second end of the optical guide unit is different from the first end of the optical guide unit, and
the first end face of the cover member is in contact with an inner side wall of the case.

12. The light source module according to claim 2, wherein one of a first end of the optical guide unit or a second end of the optical guide unit reaches the first end face of the cover member,
the second end of the optical guide unit is different from the first end of the optical guide unit, and
the first end face of the cover member is open.

13. The light source module according to claim 1, wherein the glass substrate is configured to transmit the emitted light,
the diffusion plate is configured to diffuse the transmitted light, and
a part of the wave guide is disposed on the glass substrate.

14. The light source module according to claim 1, wherein the detection unit is a solid-state imaging device,
the solid-state imaging device includes a light-receiving region, and
the wave guide is further configured to guide the part of the emitted light to a part of the light-receiving region.

15. The light source module according to claim 1, wherein the detection unit is a light receiving element.

16. A distance measuring device, comprising:
a light-emitting unit configured to emit light;
a light-receiving unit configured to detect a reflected light that is associated with the emitted light; and
a control unit configured to determine a distance to an object based on the reflected light, wherein
the light-emitting unit comprises:
a light source;
a case that houses the light source, wherein
the case includes an emission opening, and
the light source is configured
to emit the light through the emission opening of the case;
a cover member comprising a glass substrate and a diffusion plate configured to transmit the emitted light, wherein the cover member is at the emission opening of the case;
a wave guide configured to guide a part of the emitted light in a specific direction, wherein
the specific direction is different from a traveling direction of the emitted light,
the wave guide includes an optical guide unit that is on the cover member,
the optical guide unit extends linearly from one of a first end face of the cover member or a second end face of the cover member and
the second end face of the cover member is different from the first end face of the cover member;
a detection unit configured to detect a quantity of the guided part of the emitted light; and
a driving unit configured to drive the light source based on the detected quantity of the guided part of the emitted light.

17. A control method, comprising:
in a light source module:
emitting light through a light source, wherein
a case houses the light source,
the case includes an emission opening, and
the light is emitted through the emission opening of the case;
transmitting the emitted light through a cover member comprising a glass substrate and a diffusion plate that is disposed at the emission opening of the case;
guiding a part of the emitted light through a wave guide in a specific direction, wherein
the specific direction is different from a traveling direction of the emitted light,
the wave guide includes an optical guide unit that is on the cover member,
the optical guide unit extends linearly from one of a first end face of the cover member or a second end face of the cover member, and
the second end face of the cover member is different from the first end face of the cover member;
detecting a quantity of the guided part of the emitted light;
driving the light source based on the detected quantity of the guided part of the emitted light; and stopping the emission of the light source based on the detected quantity of the guided part of the emitted light is lower than a specific threshold.

18. A control method, comprising:
in a light source module:
- emitting light through a light source, wherein
  - a case houses the light source,
  - the case includes an emission opening, and
  - the light is emitted through the emission opening of the case;
- transmitting the emitted light through a cover member comprising a glass substrate and a diffusion plate that is at the emission opening of the case;
- guiding a part of the emitted light through a wave guide in a specific direction, wherein
  - the specific direction is different from a traveling direction of the emitted light,
  - the wave guide includes an optical guide unit that is on the cover member
  - the optical guide unit extends linearly from one of a first end face of the cover member or a second end face of the cover member, and
  - the second end face of the cover member is different from the first end face of the cover member;
- detecting a quantity of the guided part of the emitted light;
- driving the light source based on the detected quantity of the guided part of the emitted light; and
  - increasing an output of the light source based on the detected quantity of the guided part of the emitted light is lower than a specific threshold.

* * * * *